United States Patent
McCanne

(10) Patent No.: US 9,252,963 B2
(45) Date of Patent: *Feb. 2, 2016

(54) PERFORMING MULTICAST COMMUNICATION IN COMPUTER NETWORKS BY USING OVERLAY ROUTING

(71) Applicant: Google Inc., Mountain View, CA (US)

(72) Inventor: Steven McCanne, Berkeley, CA (US)

(73) Assignee: Google Inc., Mountain View, CA (US)

(*) Notice: Subject to any disclaimer, the term of this patent is extended or adjusted under 35 U.S.C. 154(b) by 90 days.

This patent is subject to a terminal disclaimer.

(21) Appl. No.: 14/140,502

(22) Filed: Dec. 25, 2013

(65) Prior Publication Data
US 2014/0105209 A1    Apr. 17, 2014

Related U.S. Application Data

(63) Continuation of application No. 13/758,608, filed on Feb. 4, 2013, now Pat. No. 8,667,173, which is a continuation of application No. 12/426,185, filed on Apr. 17, 2009, now Pat. No. 8,370,522, which is a (Continued)

(51) Int. Cl.
*H04L 12/28* (2006.01)
*H04L 12/18* (2006.01)
(Continued)

(52) U.S. Cl.
CPC ...... *H04L 12/1836* (2013.01); *H04L 29/06027* (2013.01); *H04L 45/04* (2013.01); *H04L 45/16* (2013.01); *H04L 65/403* (2013.01);
(Continued)

(58) Field of Classification Search
None
See application file for complete search history.

(56) References Cited

U.S. PATENT DOCUMENTS 3,483,832 A * 12/1969 Boll .................. F23G 5/34
                                                    110/203
5,392,223 A    2/1995 Caci
(Continued)

FOREIGN PATENT DOCUMENTS

EP    0598696    11/1992
WO    98/57275   12/1998

OTHER PUBLICATIONS

Touch, The X-Bone, pp. 1-3, Mar. 1997.
(Continued)

*Primary Examiner* — Andrew Lai
*Assistant Examiner* — Jamaal Henson
(74) *Attorney, Agent, or Firm* — Fish & Richardson P.C.

(57) ABSTRACT

An overlay protocol and system for allowing multicast routing in the Internet to be performed at the application level. The overlay protocol uses "native" Internet multicast and multicast routing protocols to route information, according to overlay routing tables. Overlay groups are mapped to native multicast groups to exploit native multicasting in regional or local forwarding domains. Use of the overlay protocol allows overlay distribution to be handled in a more intelligent and bandwidth-managed fashion. Overlay routers are placed at each of several local area networks, Internet service provider's point of presence, enterprise, or other cohesively-managed locations. The overlay computers are configured according to bandwidth and security policies, and perform application-level multicast distribution across the otherwise disjoint multicast networks by using the overlay routing. The result is an overlay multicast network that is effectively managed according to local network management policies. Application-level control can be applied to the transferred data at the overlay routers.

20 Claims, 9 Drawing Sheets

Related U.S. Application Data continuation of application No. 11/544,792, filed on Oct. 5, 2006, now abandoned, which is a continuation of application No. 10/600,142, filed on Jun. 19, 2003, now Pat. No. 7,133,928, which is a continuation of application No. 09/323,869, filed on Jun. 1, 1999, now Pat. No. 6,611,872.

(60) Provisional application No. 60/115,454, filed on Jan. 11, 1999.

(51) Int. Cl.
*H04L 29/06* (2006.01)
*H04L 12/715* (2013.01)
*H04L 12/761* (2013.01)

(52) U.S. Cl.
CPC ........... *H04L65/4076* (2013.01); *H04L 12/185* (2013.01); *H04L 12/1886* (2013.01)

(56) References Cited

U.S. PATENT DOCUMENTS

| | | | |
|---|---|---|---|
| 5,956,716 A | 9/1999 | Kenner et al. | |
| 6,003,030 A | 12/1999 | Kenner et al. | |
| 6,006,267 A * | 12/1999 | Nguyen | H04L 12/184 709/227 |
| 6,041,354 A | 3/2000 | Biliris et al. | |
| 6,046,980 A | 4/2000 | Packer | |
| 6,052,718 A | 4/2000 | Gifford | |
| 6,112,239 A | 8/2000 | Kenner et al. | |
| 6,138,162 A | 10/2000 | Pistriotto et al. | |
| 6,222,841 B1 | 4/2001 | Taniguchi | |
| 6,292,834 B1 | 9/2001 | Ravi et al. | |
| 6,337,881 B1 | 1/2002 | Chaddha | |
| 6,360,262 B1 | 3/2002 | Guenthner et al. | |
| 6,374,303 B1 * | 4/2002 | Armitage | H04L 45/00 370/390 |
| 6,415,323 B1 | 7/2002 | McCanne et al. | |
| 6,442,603 B1 | 8/2002 | Borella | |
| 6,483,822 B1 | 11/2002 | Lioy et al. | |
| 6,483,832 B1 * | 11/2002 | Civanlar et al. | 370/390 |
| 6,611,872 B1 * | 8/2003 | McCanne | H04L 12/1836 370/390 |
| 7,080,157 B2 * | 7/2006 | McCanne | H04L 12/1836 370/392 |
| 7,133,928 B2 * | 11/2006 | McCanne | H04L 12/1836 370/390 |
| 7,506,370 B2 * | 3/2009 | Aggarwal | H04L 63/20 380/259 |
| 8,370,522 B2 * | 2/2013 | McCanne | H04L 12/1836 370/390 |

OTHER PUBLICATIONS

Amir et al., "An Application Level Video Gateway" 1998.
Thomas IP Multicast in RealSystem G2, Jan. 15, 1998, pp. 1-14.
Deering, S. et al., "Multicast Routing in Datagram Internetworks and Extended LANs." ACM Transactions on Computer Systems, vol. 8, No. 2, May 1990, pp. 85-110.
Maffeis, S. et al., "GTS: A Generic Multicast Transport Service". In UBILAB Technical Report 94.6.1, 1994.
Bormann, C. et al., "Mtp-2: Towards achieving the S.E.R.O properties for multicast transport" in International Conference on Computer Communications Networks (San Francisco, CA) Sep. 1994.
Parsa, M. et al., "Scalable Internet Multicast Routing", Proceedings of ICCCN '95, Las Vegas, Nevada, Sep. 1995.
Thyagarajan, A.S. et al., Hiearchical Distance-Vector Multicast Routing for the MBone, Sigcomm '95, Cambridge, Massachusetts, Aug. 1995.
Yavatkar. R. et al., "A Reliable Dissemination Protocol for Interactive Collaborative Applications", ACM Multimedia 1995, San Francisco, CA, Nov. 1995.
Amir, E. et al., "An Application Level Video Gateway" In Proc. ACM Multimedia 1995, San Francisco, CA, Nov. 1995.
Lin, J.C et al., "Rmtp: A reliable multicast transport protocol" Proceedings of the IEEE INFOCOM '96, pp. 1414-1424.
Deering, S. et al., "An Architecture for Wide-Area Multicast Routing" WEE/ACM Transactions on Networking, vol. 4, No. 2, Apr. 1996.
Atwood, J. et al., "Reliable Multicasting in the Xpress Transport Protocol" Proceedings of the 21$^{st}$ Local Computer Networks Conference, Minneapolis, Minn. Oct. 13-16, 1996.
Perkins, C. et al., "Real-time audio and video transmission of IEEE GLOBECOM '96 over the internet," IEEE Communications Magazine, vol. 35, pp. 30-33, Apr. 1997.
Sharma, P et al., "Scalable Timers for Soft State Protocols," Proceedings IEEE Infocom '97, Kobe, Japan, Apr. 1997.
Mittra, S., "Iolus: A framework for scalable secure multicasting," ACM Computer Communication Review, vol. 27, pp. 277-288, Oct. 1997. ACM SIGCOMM '97, Sep. 1997.
Hodel, H., "Policy Tree Multicast Routing: An Extension to Sparse Mode Source Tree Delivery," ACM Computer Communication Review, vol. 28, No. 2 pp. 78-97, Apr. 1998.
Kumar, S. et al., The MASC/BGMP Architecture for Inter-domain Multicast Routing, Proc. of SIGCOMM '98, Sep. 1998, Vancouver, B.C.
Decasper et al., "Router plugins: a software architecture for next generation routers" Proceedings of the ACM SIGCOMM '98, Vancouver, British Columbia, Canada, Sep. 1998.
Handley, M. et al., "Very large conferences on the Internet: the Internet multimedia conferencing architecture," Computer Networks(31)3 (1999) pp. 191-204.
Holbrook, H. et al., "IP Multicast Channels: Express Support for Large-scale Single-Source Applications". Computer Communication Review, a publication of ACM SIGCOMM, vol. 29, No. 4, Oct. 1999.
Casner. S, "Frequently asked questions (FAQ) on the multicast backbone(MBONE)". On-line documentation available from ftp://venera.isi.edu/mbone/faq.txt, Jan. 1993.
Finlayson, R. "The Multicast Attribute Framing Protocol", http://www/live.com/mafp.txt.
Smallcast Technical white paper Cisco Systems http://cco.cisco.com/warp/public/cc/cisco/mkt/ios/tech/iptv/tech!hqv wp.htm.
Real Broadcast Network (RBN) Splitters www.real.comlsolutions/rbn/whitepaper.html.
Farinacci, D. et al., Pretty good multicast (PGM) transport protocol specification, Internet Draft, Internet Engineering Task Force, Jan. 1998.
Farinacci, D. et al., "Use of anycast clusters for inter-domain multicast routing." Internet Draft, Internet Engineering Task Force, Mar. 1998.
Robertson, K. et al., StarBust multicast file transfer protocol (MFTP) specification, Internet Draft, Internet Engineering Task Force, Apr. 1998.
Banerjea, A. et al., "Designing QoSMIC: a quality of service sensitive multicast internet protocol," Internet Draft, Internet Engineering Task Force, May 1998.
Thaler, D. et al., "Border Gateway Multicast Protocol (BGMP): Protocol Specification" Internet Draft Nov. 1998.
Casey, L. et al., "IP VPN Realization using MPLS Tunnels," Internet Engineering Task Force, Nov. 1998.
Finlayson, R., "A More loss-Tolerant RTP Payload format for MP3 Audio." Internet Draft, Jan. 1999.
Finlayson, R., "IP Multicast and Firewalls." Internet Draft. May 1999.
Blazevic, L. et al., "Distributed Core Multicast (DCM): a routing protocol for many small groups with application to mobile IP telephony", Internet Engineering Task Force, Jun. 1999.
Hampton, D et al., "The IP Telephony Border Gateway Protocol (TBGP)," Internet Engineering Task Force, Jun. 1999.
Finlayson, R., "The UDP Multicast Tunneling Protocol". Internet Draft, Jul. 1999.

(56) References Cited

OTHER PUBLICATIONS

Malis, A. et al., "A Framework for IP Based Virtual Private Networks" Internet Draft, Aug. 1999.
Waitzman, D. et al., "Distance Vector Multicast Routing Protocol", Request for Comments, RFC 1075, Nov. 1998.
Hanks, S. et al., "Generic Routing Encaspulation" Request for Comments RFC 1701, Oct. 1994.
Farinacci, D. et al., "Generic Routing Encapulation over IPv4 networks". Request for Comments, RFC 1702, Nov. 1994.
Schulzinne, H. et al., "RTP: A transport protocol for real-time applications." Request for Comments. RFC 1889, Jan. 1996.
Fenner, W. "Internet Group Management Protocol," Version 2, RFC2236, Nov. 1997.
Ballardie, A., "Core Based Trees (CBT) Multicast Routing Architecture" Request for Comments, RFC 2201, Sep. 1997.
Estrin, D. et al., "Protocol Independent Multicast-Sparse Mode (PIM-SM)." Request for Comments, RFC 2362, Jun. 1998.
Arrango, M. et al., "Gateway Control Protocol (MGCP)" Version 1.0, RFC 2705, Oct. 1999.
Amir et al. "Active Service Framework and Application to real-time Multimedia Transcoding," Proceedings of the ACM SIGCOMM '98 conference on Applications, technologies, architectures, and protocols for computer communication, Oct. 1998, pp. 178-189.
Baker, "Requirements for IP Version 4 Routers," RFC 1812, pp. 1-175, Jun. 1995.
Chawathe et al. "A proxy Architecture for Reliable Multicast in Heterogeneous Environment," Multimedia '98 Proceedings of the sixth ACM international conference on Multimedia, 1998, pp. 151-159.
Crawley et al. "A Frame Work for QoS-based Routing in the Internet," RFC 2386, Aug. 1998, pp. 1-37.
Current claims for foreign patent application No. 00 961 467.8-1244 (5 pgs).
Deering et al., "The PIM Architecture for Wide-Area Multicast Routing," Networking, IEEE/ACM Transactions on, vol. 4, Issue2, pp. 153-162, Apr. 1996.
Gralla, P., How the Internet Works, special ed., Ziff-Davis Press, pp. 202-205, 1997.
Handley, M., et al., SDP: Session Description Protocol, IETF Internet Draft, draft-ietf-mmusic-sdp-00.ps, pp. 1-15, Mar. 1995.
Handley, M., et al., SIP: Session Initiation Protocol, IETF Internet Draft, draft-ietf-mmusic-sip-02.ps, pp. 1-30, Mar. 1997.
McCanne et al. "Receiver-driven Layered Multicast," Aug. 1996, Conference proceedings on Applications, technologies, architectures, and protocols for computer communications, pp. 117-130.
Office Communication from EPO for foreign patent application No. 00 961 467.8-1244 (4 pgs).
RealServer Administration Guide, RealSystem G2, Real Networks, Inc., pp. 1-188, Nov. 23, 1998.
Web Page Listing, service.real.com/help/library/earlier_servers. html, pp. 1-7, downloaded on Feb. 20, 2004.

* cited by examiner

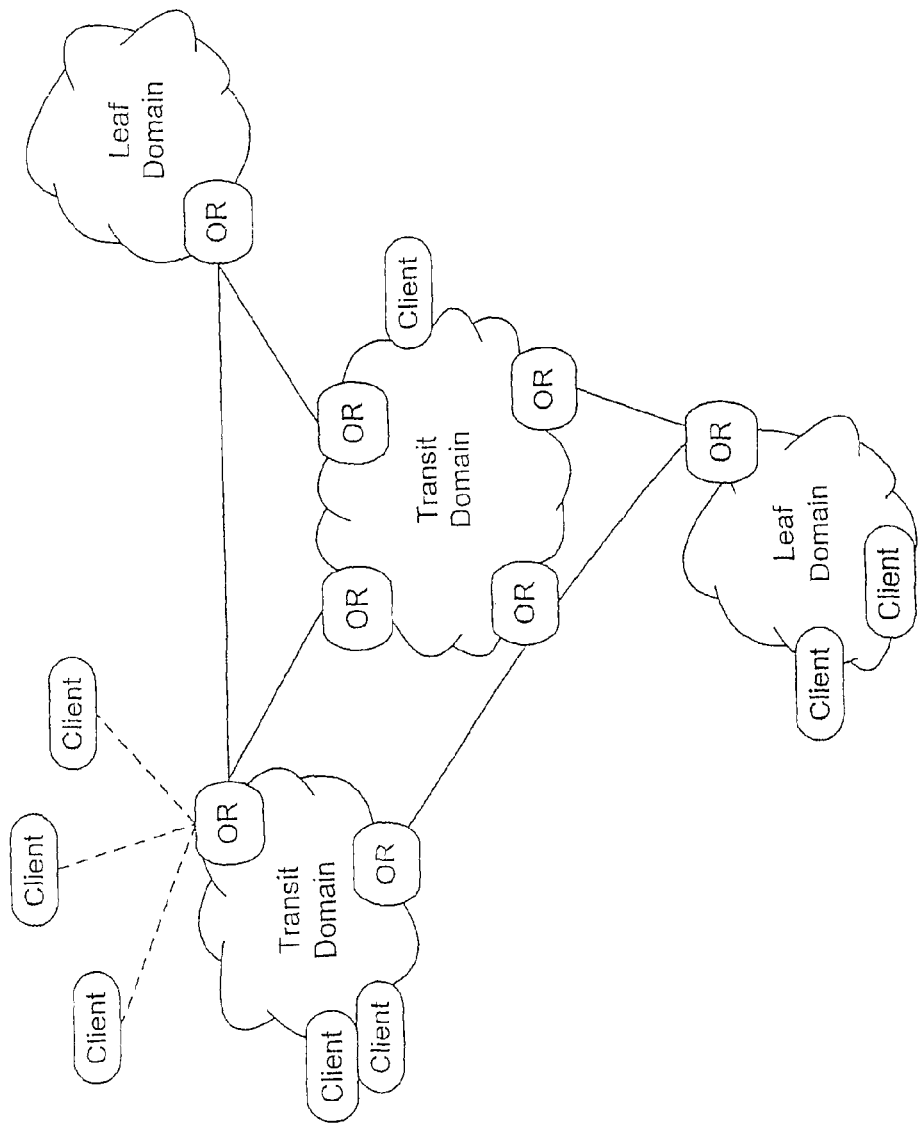
Figure 2: OMN Architecture

PERFORMING MULTICAST COMMUNICATION IN COMPUTER NETWORKS BY USING OVERLAY ROUTING

CROSS-REFERENCE TO RELATED APPLICATIONS; BENEFIT CLAIM

This application claims benefit of priority under 35 U.S.C. §120 as Continuation of U.S. patent application Ser. No. 13/758,608, filed Feb. 4, 2013, the entire contents of which is hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

U.S. patent application Ser. No. 13/758,608 is a continuation of U.S. patent application Ser. No. 12/426,185, filed Apr. 17, 2009, now U.S. Pat. No. 8,370,522, which is a continuation of U.S. patent application Ser. No. 11/544,792, filed Oct. 5, 2006, which is a continuation of U.S. patent application Ser. No. 10/600,142 filed Jun. 19, 2003, now U.S. Pat. No. 7,133,928, which is a continuation of U.S. patent application Ser. No. 09/323,869 filed Jun. 1, 1999, now U.S. Pat. No. 6,611,872, which claims the benefit of priority from U.S. Provisional Application Ser. No. 60/115,454, filed Jan. 11, 1999, the contents of each of which is incorporated herein by reference in its entirety for all purposes as if fully set forth herein. This application is related to the following provisional applications which are hereby incorporated by reference as if set forth in full in this specification: U.S. Provisional Patent application Ser. No. 60/137,160, entitled "SYSTEM FOR BANDWIDTH ALLOCATION IN A COMPUTER NETWORK" filed on Jun. 1, 1999; and U.S. Provisional Patent application Ser. No. 60/137,153 entitled "SYSTEM FOR MULTIPOINT INFRASTRUCTURE TRANSPORT IN A COMPUTER NETWORK" filed on Jun. 1, 1999.

BACKGROUND

As the Internet gains in popularity it is desirable to allow broadcasts of live media, such as a television program or radio program, over the Internet. However, a problem with such "streaming media" broadcasts is that they require very high data transfer rates across many servers, routers and local area networks that form the Internet. Because of this, high-quality, scalable broadcasts, or "multicasts," of streaming media information to massive numbers of end-users at once over the Internet have not been achieved to date.

Examples of attempts to design and. deploy multicast systems for the Internet include systems by RealNetworks and Broadcast.com. RealNetworks has built an Internet broadcast infrastructure called the Real Broadcast Network (RBN) while Broadcast.com has partnered with Internet Service Providers (ISPs) and content providers to build a broadcast system based on native Internet multicast routing. A typical streaming broadcast consists of a server that unicasts a User Datagram Protocol (UDP) flow to each requesting client. Bandwidth is managed very crudely by simply limiting the number of simultaneous active flows via some simple configuration hook at the server. While this approach works for today's demands, it wastes network bandwidth and cannot scale to very large audiences anticipated in the future.

Although some existing products (like NetShow and Cisco's IP/TV) support multicast, Internet Service Providers (ISPs) and enterprise network managers have been slow to adopt multicast because it is difficult to configure, manage, and debug. For some companies, these deployment problems are crucial barriers because they view multicast as critical for their long-term viability and feel that failure to successfully integrate multicast could compromise their mission.

A successful Internet broadcast system depends on its ability to broadcast audio and video programming to a large number of simultaneous users. Two approaches for broadcasting streaming media are replicated unicast (one user per stream) and multicasting (multiple users per stream).

While unicast delivery has enjoyed tremendous success as the fundamental building block of the Internet, multicast has proven far more complex and many technical barriers remain that prevent multicast from being deployed across the wide area. Despite a decade of research and development, interdomain multicast routing has yet to be successfully realized and there are many reasons to believe that multicast, in its present form, may never be universally deployed throughout the Internet. In this case, applications that assume ubiquitous multicast connectivity to attain scalable performance will never become feasible. On the other hand, multicast, when restricted to a singly administered network domain, has been much easier to configure and manage, and for this reason, has been a resounding success in isolated deployments. That is, it's easy to build an isolated multicast "cloud" as long as it doesn't span multiple administrative domains and involve highly heterogeneous equipment with different multicast implementations.

While uniform and homogeneous multicast clouds can effectively carry multicast traffic that is isolated to LANs or autonomous corporate networks, a wide range of compelling applications, such as streaming media broadcasts, are potentially enabled by interconnecting the isolated multicast clouds into a very large-scale distribution network. However, attempts to use wide area multicast routing protocols to solve this problem have failed. Another problem with interconnecting multicast clouds has been lack of control over the multicast traffic from domain to domain. This implicates not only bandwidth considerations, but security issues as well.

Thus it is desirable to complement and enhance the vast array of existing servers and end-clients with a state-of-the-art system that provides an improved network infrastructure for achieving multicasting of information. Such a system should enhance existing digital audio/video/media applications and enable them to work more effectively at large scale and across heterogeneous environments. The system should provide flexible bandwidth management and diagnostic tools to network managers such as by providing localized control over traffic and content of multicast data. The system should make use of existing, widely deployed communication protocols and procedures to achieve efficient transfer of information.

SUMMARY OF THE INVENTION

The present invention is to be embodied in a commercial product by FastForward Networks, called "MediaBridge." Each MediaBridge is a process that is executed on a computer, or other processor or processing device, connected to a network. Multiple MediaBridges transfer data using an "overlay" network. In a preferred Internet embodiment, the overlay protocol uses "native" Internet protocols to route information, according to overlay routing tables, between otherwise disjoint and isolated multicast clouds. This allows the overlay distribution to be handled in a more intelligent and bandwidth-managed fashion. For example, MediaBridges are placed at each of several local area networks (LANs), ISP "point of presence" (POP), enterprise, or other cohesively-managed locations. The MediaBridges are configured according to bandwidth and security policies, and perform application-level multicast distribution across the Network Access Points (NAPs) using overlay routing. The result is an overlay multicast network that is effectively managed according to traffic policies defined locally at each NAP.

The present invention allows application-level control to be applied to the transferred data. For example, if a confluence of high-bandwidth video flows arrives at a choke point in the network (where the choke point is either a physical bandwidth limit or an administratively configured bandwidth constraint), the MediaBridge intelligently filters and/or transforms flows so that they fit onto the outgoing link. The transformations can, for example, reduce the frame rate or resolution uniformly as opposed to simply dropping packets at the network layer (without accounting for media semantics). The invention exploits application-level activity to control adaptation. For example, in a videoconference, cues from the audio channel, or from the dispositions of the user interfaces at the clients, can be used to decide to dedicate more of the traffic class' bandwidth allocation to the current speaker.

An end-user client application can attach to the overlay network using either unicast or multicast communication between it and a MediaBridge on the overlay. Thus, a web page can have a simple "point and click" hyperlink to initiate reception of a multicast audio/video production where a channel ID is embedded in the Uniform Resource Locator (URL). Or a user can send a channel ID, or other identification, to a MediaBridge to subscribe to a program multicast.

In one embodiment of the invention an overlay routing processor for transferring information over a computer network is disclosed. The computer network has a native routing protocol. The overlay routing processor includes instructions for associating computers on the network with a given overlay group; instructions for determining whether received information is associated with the given overlay group; and instructions for routing the received information to the computers associated with the given overlay group by using the native routing protocol.

BRIEF DESCRIPTION OF THE DRAWINGS

FIG. 2 illustrates the Overlay Multicast Network Architecture.

DESCRIPTION OF THE SPECIFIC EMBODIMENTS

Figure 1:
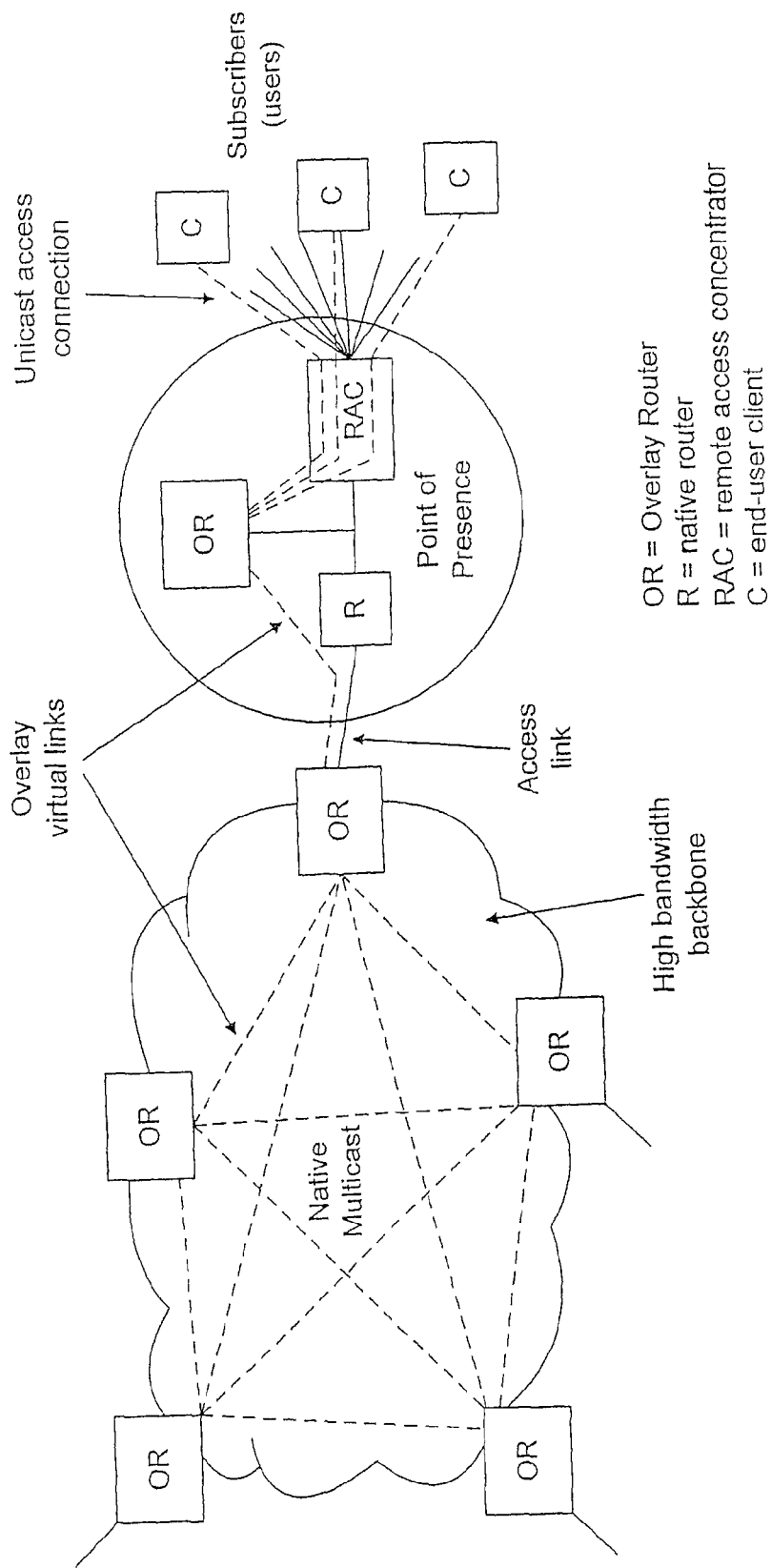
FIG. 1 shows overlay router arrangements.

The present invention implements "overlay" multicasting. So-called because some of the routing processing by MediaBridge's uses a routing scheme that is independent of, in addition to, and at a higher level than the prior art "native" scheme. With the approach of the present invention, any of the current multicasting techniques, such as DVMRP, PIM, CBT, etc. are referred to as "native" multicasting, or "native protocols."

The invention uses native multicast only as a forwarding optimization where it is locally viable—typically within medium-scale, singly-administered, homogeneous network domains. In this model, the network consists of a set of isolated native multicast clouds upon which a virtual network of application-level routing agents called "overlay routers". The overlay routers (i.e., the MediaBridge computers) implement multicast routing protocol that makes use of sophisticated application-level knowledge and management infrastructure. Unicast clients can connect directly to overlay routers via unicast so that regions of the network that do not provide native multicast support can be reached. Unlike existing multicast technologies, this allows clients to connect to overlay routers using unicast UDP or TCP through a redirection and location service. This allows clients that are not directly attached to a multicast capable network to communicate and receive transmissions from the overlay network.

Moving wide-area multicast routing out of the network layer and up to the application layer, affords number of advantages:

Simplicity. The overall multicast routing problem is simplified because it is decomposed into two separable and individually tractable sub-problems: (1) the configuration of native multicast routers in a singly administered network domain and (2) the configuration of overlay routers to interconnect the disparate regional networks and tightly manage the bandwidth consumed by multicast across these domains.

Rich Management. Because routing is carried out at the application layer, we can implement well-defined policies that reflect application priorities and provide high-level services such as billing. Routers are no longer hidden by a thick protocol layer that hides application knowledge. Instead, the overlay routers can be configured more like servers and bandwidth managed and apportioned intelligently across different application classes.

Efficient Rendezvous. Application-level knowledge vastly simplifies the problem of rendezvous. Because different applications naturally have different models for how the distributed components might interact or at what scale and directionality they interact, the rendezvous mechanism can be optimized by exploiting application requirements. For example, a streaming video server might best be contacted by querying the content provider's ordering service or by contacting the corporate headquarters' web page. Alternatively, a videoconference might best be initiated by contacting an H323 Multi-point control unit (MCU) that is near the physical conference room of the hosting site.

The invention is next discussed by first presenting the general architecture of the overlay multicast network approach. Next, detailed examples of transaction steps using the architecture are described.

The Overlay Multicast Network Architecture
1. Introduction

This section describes the overlay multicast network (OMN) architecture of the present invention.

The OMN architecture utilizes a two-level addressing strategy, where overlay addresses are carried in an additional overlay header (which appears after the 30 UDP header), but before the user's UDP payload, and native multicast addresses are. computed from overlay addresses using a novel hashing scheme that exploits multicast address scopes. To properly route traffic across the overlay network, overlay routers implement a multicast routing protocol that is, in some ways, analagous to BGMP and BGP. In addition, unicast clients can connect directly to overlay routers via UDP so that regions of the network that do not provide native multicast support can be reached. The overlay routers operate at the application-level. This allows the overlay routers to be easily extended with application-level knowledge to carry out semantically-aware transformations conditioned on bandwidth constraints specified by external policies.

The OMN architecture includes a number of core elements:
- a forwarding and routing framework for computing multicast distribution tree across the virtual overlay network,
- a multipoint reliable transport protocol for disseminating data reliably into and across the overlay network,
- a plugin framework for extending overlay routers with new application-level knowledge,
- a bandwidth scheduling framework for scheduling traffic classes according to hierarchical link-sharing policies,
- a method for communicating between plugins and the bandwidth management subsystem to effect application-level adaptation from within the network, and
- a referral directory service that redirects end hosts to the closest overlay router:

This application is principally concerned with the routing components of 20 the OMN architecture and the relationship among the different subsystems. Other related applications include those referenced at the beginning of this specification.

2. The Network Model

The network model assumed by an overlay network is a collection of isolated (but possibly overlapping) regions of native multicast connectivity. Overlay routers are deployed across this arrangement of multicast clouds and peer with each other either via unicast or multicast UDP/IP to form a network of application-aware multicast forwarding agents. End hosts inject traffic into the overlay network using either native multicast across a "leaf scope" or using unicast communication directly to a nearby overlay router.

Even though the OMN framework operates at the application layer, overlay routers must compute what amounts to network-level routes to determine how to flood multicast flows across and throughout the appropriate region of the overlay network. Thus, in the OMN architecture routing occurs at two layers, the network layer and the application layer. Because routing is carried out. the application layer, application-level knowledge can be integrated into the forwarding process to transform packet flows at points of administrative discontinuity.

In this two-layer routing model, the network (IP) source and destination addresses are rewritten on each overlay router hop, which means that certain structure and state (like address allocations and multicast spanning trees) need not be globally consistent across multicast domains. Note that this allows overlay routing without requiring all routers in the network to be upgraded to recognize and forward a new packet type. No change to the existing routing infrastructure is needed because of the two-layer addressing scheme. That is, existing multicast routers can remain intact while new overlay routers are installed at the borders of administrative boundaries, or domains. We thus exploit existing native multicast routing technology within administrative domains and across transit domains when and where available.

2.1 The Overlay Multicast Service Model

In contrast to native IP Multicast, the overlay multicast service model transforms packets as necessary in order to forward application-level flows in a bandwidth-managed fashion. In this model, an application may inject a flow into the network without concern that it will congest the network since the overlay routers will thin the stream as necessary in choke points in the network and ensure that all policy-defined bandwidth constraints are adhered to. In addition, sources must explicitly signal to the network their intention to send and optionally indicate type information describing their traffic. Administrative policies can be configured into the infrastructure. These policies can permit or restrict sources from sending based on rich, application-level policies.

To maximize the congruence between the OMN architecture and the existent IP Multicast service interface, hosts use the standard IP Multicast interface to 30 inject data packets into and receive packets from an OMN. In one embodiment of the invention, overlay multicast senders (or proxies for the sender) explicitly signal to the network their intention to transmit. This is unlike IP multicast, where hosts may simply send packets addressed to a Class D multicast group without any explicit signaling. As part of this dialogue, the sender describes the channel that it intends to use (e.g., UDP multicast, UDP unicast, or TCP), and, once negotiated, overlay-enabled multicast packets may be sent into the network. This sender setup process may fail if the source does not have administrative permission to send. Thus, OMN sources can be tightly controlled in contrast to normal IP multicast, which provides no control over senders.

To invoke application-level processing and management capabilities within the OMN network infrastructure, an OMN sender (or proxy thereof) may signal application knowledge into the network using a multipoint data dissemination framework. In the preferred embodiment, this framework uses a protocol known as Multipoint Infrastructure Transport (MINT) Protocol. MINT provides a group-oriented, reliable delivery mechanism between a nodes in the OMN and is described in detail in a co-pending patent application referenced at the beginning of this specification.

Using MINT, senders can attach named values to an overlay multicast group which is published into and across the overlay network, allowing other group members as well as network entities to query this "database" of state. Each tuple in the database, called a "mint", is identified by its owner (the OMN sender) and name (and implicitly the group). The tuples are disseminated reliably to all parts of the network with active participants. Note that given tuples need to flow only to overlay routers that fall along a path from the source to the set of active receivers for that group. An end host may query the OMN subsystem to discover and/or enumerate all known owners and all known keys published by each owner. In turn, the values can be queried by name/owner, and the application can be asynchronously notified when the owner modifies the value.

Certain mints are reserved for system specific functions that, for instance, map an overlay group to an application type or describe the attributes of an overlay group so that it can be mapped into locally defined traffic classes in different parts of the network. For flows that require application-level processing and/or traffic management, a special "setup mint" provides the requisite information and must precede the transmission of data. Packets are dropped by the overlay network if the setup mint is not present, including the time during which the setup mint is in transit.

2.2 Virtual Interfaces

A fundamental communication construct in overlay multicasting is a path abstraction called a "virtual link", which joins together an overlay router with other overlay routers and with end hosts. The (virtual) attachment abstraction of a link to an overlay router is called a virtual interface or VIF. There are three primary classes of VIF: a transit VIF (TVIF) interconnects two or more overlay routers in a peering relationship, a leaf VIF (LVIF) interconnects end hosts with native multicast connectivity to the overlay network, and a unicast bank VIF (UVIF) interconnects end hosts without multicast access via unicast to a "nearby" overlay router.

Applications send and receive OMN packets through an overlay router that manages the LVIF. The overlay router transforms each native multicast packet into an overlay packet by encapsulating it in an overlay header, which is situated between the UDP header and application payload. This overlay header includes the destination overlay group, which consists of a 32-bit rendezvous point (RP) identifier and a 32-bit channel number. When a packet reaches its destination LVIF, the last-hop overlay router strips off the overlay header and forwards the packet to the end host (or set of end hosts) using unicast (or multicast) UDP.

Each transit VIF represents a link in the overlay network topology and overlay routers forward packets to each other over these virtual paths. A collection of overlay routers can peer with one another as a group over a "multicast transit VIF". Overlay routers can peer with each other directly in a "point-to-point" configuration using a "unicast transit VIF". In addition, end-hosts inject/receive packets from the overlay network by either (1) transmitting packets into a leaf VIF using native multicast or (2) transmitting packets directly to an overlay router using unicast UDP. For the latter case, the address of a nearby overlay router can be queried using a directory service.

An example of overlay routing is shown in FIG. 1. FIG. 1 shows overlay routers (ORs) arranged to handle traffic in a transit domain using native multicast, and in a point-of-presence system between a native router (R) and remote, access concentrator (RAC). Many such arrangements of overlay routers are possible. The number, placement and physical connection of overlay routers is a design tradeoff with respect to desired efficiency, cost and features as is practicable.

2.2.1 Overlay Scope

When an overlay router sends an overlay packet out a VIF, it must determine the network-layer address of the "next hop". If the VIF is composed of only a single peer, then the address is simply the unicast address of that peer. But, for a collection of peers, the overlay router must map the overlay group into a native multicast group so that the peers can receive the traffic efficiently using native multicast. To provide controls over transit traffic containment, this address is chosen from a range of administratively scoped addresses, which are configured into the overlay router when the peering relationship is established. This scope is referred to as an overlay scope in the OMN architecture.

The native IP multicast service supports two type of "scoping" abstractions: hop-based scope and administrative scope. In hop-based scope, the time-tolive (TTL) field in the IP packet header constrains the distribution of a packet. Because the TTL limits the number of forwarding hops that a packet can sustain before being dropped, the source host can constrain the reach of the packet by setting the TTL field to an appropriate value. In administrative scope, routing boundaries are configured borders between scopes (e.g., between separate organizations). A routing boundary is represented by a range of multicast addresses, i.e., an administrative boundary is imposed by preventing multicast packets that fall within the administrative address range to be blocked at that boundary point. A special block of multicast addresses is reserved for administrative scope (239.0.0.0 to 239.255.255.255) and since administratively scoped traffic does not flow across boundaries, scoped addresses need not be unique across organizational boundaries.

Associated with each VIF is a rule by which overlay multicast addresses are mapped onto the overlay scope, or range of native multicast addresses. An overlay scope is expressed as an IP4 Class D address and a prefix length, e.g., 249.2/16 represents the block of addresses from 249.2.0.0 to 249.2.255.255. An algorithm to deterministically map an overlay multicast address into an address in an arbitrary overlay scope can be easily constructed using well-known hashing techniques.

2.2.2 Leaf VIFs

Multicast traffic enters and leaves the overlay network through a special VIF called a "leaf VIF" (LVIF) (so called because these VIFs are situated at the leaves of the multipoint overlay distribution tree). FIG. 2 is an illustration of overlay routers arranged in leaf and transit domains. To contain and control traffic within the LVIF, a TTL-based multicast scope is imposed at the desired boundary of the leaf. That is, to create an LVIF, a network administrator determines which subnets in the network should comprise that LVIF, and in turn, configures each router attached to those subnets with an appropriate TTL threshold. In turn, applications and overlay routers inject traffic into the LVIF with a TTL less than the threshold thereby containing the reach of raw multicast traffic as desired.

Unfortunately, TTL scopes can lead to inefficient use of bandwidth because TTL-scoped traffic often cannot be "pruned" off subnets that have no interested receivers. To remedy this, administrative scope boundaries can be placed precisely along the border of the leaf scope in question. If applications then use addresses from these ranges, the traffic is consequently scoped and pruned off subnets (within the leaf) for which there are no receivers. However, because the overlay network effectively bridges spatially distinct multicast sub-regions, the usual locality implied by administrative scopes no longer applies. Thus, such scopes must be carefully used and set aside for use only for the overlay network (i.e., not relied upon for other uses of scoped traffic since the overlay network deliberately leaks this traffic outside the region). Another problem with administrative scopes is that different sites might choose different address ranges for scopes. Thus, the overlay multicast architecture reserves a special range of administratively scoped addresses to be used exclusively for the-purpose of imposing boundaries on leaf VIFs.

Given that the LVIF scoping abstraction is in place to constrain the reach of data traffic, end hosts and overlay routers still must exchange control traffic in order to determine which traffic to forward into and out of the LVIF. That is, the overlay router at the edge of the domain must somehow determine the set of multicast groups that it must listen to in order to receive traffic from active senders. Likewise, it must determine whether receivers are present for any overlay group in question so that it can join the corresponding group across the overlay network (see the Section 4 below) and forward the consequent traffic from sources in other remote LVIFs into the local LVIF. To solve these problems, end systems and overlay routers utilize control protocols that run over well-known multicast groups and TCP to carry out the necessary state exchanges. Receiver overlay group membership is reflected to overlay routers through a protocol called the Domain-wide Group Membership Protocol (DGMP). The presence of senders for a given overlay group is signaled though the Overlay Sender Setup Protocol (SSP). In turn, senders use MINT to further attach attributes to their flows to effect application-level processing and bandwidth management of their traffic within and across the overlay network.

To enhance fault tolerance and improve routing performance, multiple overlay routers may be attached to a single LVIF. When multiple overlay routers are incident to an LVIF, they intercommunicate with each other to elect a designated router (DR) for the LVIF. The remaining overlay routers are demoted to subordinate status. As such, only the DR injects or extracts traffic from the LVIF, while the subordinate routers act as backups in case the DR goes down. In addition, the subordinate routers may peer with the DR using the normal peering relationships (see below), which improves the routing performance by potentially reducing the path lengths from a given LVIF that may be connected to multiple external networks.

In short, to receive or send packets into an OMN Network, end hosts explicitly register their intention to do so by using a combination of protocols that run across the LVIF.

LVIF Receivers

The receiver group membership protocols are relatively straightforward compared to the sender setup process. Unlike senders, which must describe their flow attributes, receivers simply announce their interest for a particular group to the overlay routers in the LVIF using DGMP, which is a standard protocol based on the Interdomain Multicast Routing (IDMR) Working Group's protocol for "Domain Wide Multicast Group Membership Reports". Like this related work, DGMP resembles the Internet Group Management Protocol (IGMP), but rather than run on isolated LANs, it runs across the LVIF. In this scheme, one or more overlay routers are attached to an LVIF and exchange messages over a well-known multicast group (the "DGMP channel"). A distributed election algorithm chooses one overlay router to be the designated router. This router, in turn, solicits membership reports by multicasting a "query" packet on the DGMP channel. All end hosts then announce their interest in all groups they wish to receive by multicasting "report" packets on the same DGMP channel. DGMP, unlike IGMP, does not suppress duplicate report packets, which means that the overlay router and/or monitoring systems running in the LVIF can learn of all active multicast receivers (e.g., for accounting or diagnostics). To avoid traffic transients induced by synchronized feedback, end hosts wait a random amount of time before generating their report packet (such that report traffic is spread adequately across the reporting interval). Since the overlay router controls the query rate, control bandwidth overhead can be easily traded off for membership accuracy through adjustments made only to the infrastructure (i.e., the overlay router).

To support unmodified multicast clients, a third-party end system may act as a proxy for another host. That is, an IP host may respond to DGMP queries on behalf of another. With this proxy capability, an agent can be built that passively monitors IGMP messages on a LAN, converts the Class D multicast addresses carried in the IGMP packets to overlay groups, and relays this overlay group information onto the DGMP channel. If this agent is placed on each LAN within an LVIF, then no changes are needed to support the receive path of conventional, unmodified multicast applications. That is, the agent notices whenever a receiver in its attached LAN joins a multicast group and relays the appropriate overlay group membership messages on the LVIF-wide DGMP channel. Note that under this scheme, when a proxied application exits, the IGMP reports cease, which automatically prevents further generation of DGMP messages.

Once the DR learns that receivers for a given group exist in its incident LVIF, it informs the routing subsystem which causes packets addressed to that group to be delivered from anywhere in the overlay network. When a packet addressed to that group arrives at the DR, the packet is forwarded onto the LVIF using UDP. At this point, the overlay header is removed and the packet is addressed to the UDP port indicated in said header.

Unicast Receivers

In many cases, multicast connectivity will not reach everywhere and many clients may want to connect to the overlay network without the aid of multicast. In this case, a receiver interacts directly with an overlay router with unicast communication. The receiver consults a well-known directory service to provide the IP address of an overlay router. In turn, it sends control information indicating the overlay group desired and the transport connection parameters that the overlay router should use to forward that group's traffic (e.g., IJDP or TCP port numbers). In addition, the client can provide the overlay router with additional application-level information that will allow it to optimize the delivery of traffic to that destination. For example, the client's Internet access bandwidth could be included so that the overlay router can deliver a version of the overlay multicast traffic signal that will adhere to this bandwidth constraint and thus not congest the network.

Clients do not have to contact the directory service directly. For example, existing clients can be made to join the overlay group as a side effect of clicking on a web link (as discussed below).

LVIF Senders

In IP Multicast, senders simply transmit packets, to a group address without invoking any sort of control protocol like IGMP. In turn, routers directly attached to the local subnet simply detect these multicast packets and forward and route them accordingly. However, this is not easily done at the application layer since an overlay router must explicitly join the native group in question in order to receive packets. Thus, the OMN architecture requires an analog protocol to DGMP for signaling the presence of sources within the LVIF to the attached overlay routers so that they can join and leave native groups as required. Additionally, the application-aware nature. of the OMN infrastructure requires that source describe the characteristics and behavior of their flows. Since this state needs to be signaled reliably into the network, an end host requires a reliable transport protocol between it and its nearby overlay router to transmit this state. Rather than implement one protocol, modeled say after DGMP, for signaling the presence of senders and another that provides a reliable delivery model for transferring flow state to the overlay router, these two functions are merged into a single protocol, the Overlay Sender Setup Protocol (SSP), which in turn leverages TCP to provide reliability. Using SSP, a sender (or proxy thereof) informs the DR of the overlay group and UDP port that it uses to carry its traffic. This allows the DR to join the group in question and relay said traffic from the indicated UDP multicast group and port into the overlay network. To effect the exchange of control state, the sender establishes an SSP connection with the DR, which is determined or discovered with a or resource discovery protocol.

SSP also provides the interface for senders to publish data into the overlay network via MINT. Mints are injected into the network using a simple protocol layered on top of the SSP channel. That is, SSP provides the conduit both for senders (or proxies) to signal their intention to send to a given overlay group and for senders to publish reliably disseminated mints into the overlay network. To support unmodified, native multicast clients, a third party agent (which we call a shim) may perform the SSP and MINT signaling functions on behalf of the unmodified client or server.

Once a setup binding is signaled into the network via SSP, the state is refreshed to persist; otherwise, the DR assumes the sender is no longer present and tears down the corresponding state. This can occur directly within SSP via explicit refresh messages, or it can be refreshed indirectly as a side effect of the sender generating data packets. That is, if the sender is continually active, there is no need to maintain the SSP connection (e.g., a streaming video server that plays out a live broadcast). Otherwise, if the sender is "bursty" (i.e., alternates between active and idle periods), the sender state must be maintained by leaving the SSP connection in place (and relying upon SSP keepalives to maintain the connection). One disadvantage of the data-driven approach, however, is that if the DR crashes, the binding must be re-established when the DR resumes or when another DR takes over.

Before the network will forward a traffic for a particular overlay group, some source in the network must publish a special, system-reserved flow descriptor mint for that group, which describes the media type of the flow and provides descriptive information that allows overlay routers to map a flow onto a locally-defined traffic class. This, in turn, allows overlay routers to perform application-specific processing and traffic management. If the flow does not need to be explicit managed or processed by the OMN infrastructure, then a flow descriptor indicated such (i.e., a best effort descriptor) must still be published into the network. Packets are dropped by the OMN until the flow descriptor is disseminated properly.

It is an error for multiple flow descriptors to be published into the network for a single overlay group from different sources. If this occurs, conflict resolution heuristics are invoked, but the results are undefined. The error condition is detected and propagated to the overlay network management facilities to be fed back to the user or users causing the problem and/or to a network operator.

Unicast Senders

In many cases, multicast connectivity will not reach everywhere and many clients may want to connect to the overlay network without the aid of multicast. In this case, a sender interacts directly with an overlay router with unicast communication to transmit traffic into the overlay multicast network. The sender consults a well-known directory service to provide the IP address of an overlay router at the edge of the OMN network. In another configuration, the sender can be statically configured with the address of a nearby overlay router. The sender sends control information indicating the overlay group that is to be used and application-level information that describes the contents of the transmission. In addition, the sender publishes arbitrary flow description information, disseminated via MINT, which can be used by traffic management policies within the network infrastructure. To initiate communication, the sender and overly router allocate and exchange transport connection parameters (e.g., UDP or TCP port numbers) that the overlay router then uses to receive that group's traffic. Once this connection is established, the sender can inject traffic into the overlay network using unicast.

2.2.3 Transit VIFs

Once a packet has been successfully delivered to an overlay router either across an LVIF via multicast or via direct unicast communication, it is propagated to all other LVIFs and unicast receivers in the overlay network that include members interested in receiving traffic sent to the overlay group in question. To accomplish this, the first-hop overlay router prepends an overlay packet header on the UDP payload and forwards the traffic to peer overlay routers according to multicast "routes" that span transit virtual link interfaces (TVIF). Overlay routers forward the packet based on the overlay group stored in the overlay header. In effect, a TVIF provides a virtual interconnection between virtually adjacent overlay routers.

Two or more overlay routers peer with each other across a TVIF using two types of communication channels:
- a bi-directional TCP connection to exchange control messages (i.e., routing messages and group membership state), and
- a unidirectional, connectionless UDP channel to forward data packets.

We refer to these two abstractions as the control channel and data channel respectively.

The data channel may be either unicast (called a TVIF) or multicast (called 30 a multicast TVIF), and in either case, packets are framed over UDP. In the unicast case, packets are simply transmitted to the adjacent peer using that peer's IP address and a well-known UDP port. That peer, in turn, receives the packet on the expected UDP port and inspects the overlay header to determine where to route the packet next, and so forth.

The Multicast TVIF

The multicast case is more complex and interesting. Here, a collection of overlay routers peer with each other using native multicast running across a single TVIF. In this case, the communication abstraction is isomorphic to a fully-connected mesh of overlay routers but with the efficiency of multicast. The control channels are effected using a fully-connected mesh of TCP connections, while the pairwise virtual data channels are effected using a single native multicast group. To isolate this multicast traffic to a well-confined region, peer routers may be placed in an overlay scope, where either or both administrative and TTL scope boundaries limit the reach of data traffic. This scope defines a specific segment of the overlay network and peer routers forward overlay packets to each other by embedding them in native multicast datagrams. To effect this, overlay routers map overlay addresses onto native group address using a well-defined hash function and the peers that are interested in receiving a certain overlay group join the corresponding native group at the network layer. In this fashion, overlay routers exploit native multicast routers across the transit regions in an efficient manner.

For example, suppose there are three routers A, B, and C, and overlay groups G1 and G2. Further suppose that the spanning tree for group G1 is incident to A and B and the spanning tree for G2 is incident to all three routers. Then, A and B would join group G1 where A, B, and C would all join group G2. Thus, when A sends packets to G1, they are sent only to B, and when anyone sends packets to G2, they are sent to everyone in this set.

However, overlay routers cannot natively join an overlay group. Instead, they hash the overlay group to a native group, where the hash function is chosen to map the entire overlay address range into the native multicast address range that is bound to the overlay scope of the multicast TVIF. Call the hash function that performs this mapping "ho." Thus, when an overlay router learns that it is incident to the multicast routing tree for some overlay group G with respect to a particular multicast TVIF, it joins the native multicast group h(G). In turn, any peer routers that forward packets for group G on that TVIF, will send the packet to group h(G) and the router in question will consequently receive the desired traffic. For example, A and B would exchange packets by joining and sending packets to group h(G1), whereas A, B; and C would each join group h(G2) and forward packets to each other over that native group. Note that each TVIF may have an h(.) that depends on the overlay scope used to define that TVIF.

Moreover, the overlay scope can configured with an arbitrary address range so that multiple multicast TVIFs can overlap in non-trivial and interesting ways. Thus, a single router can be virtually attached to multiple, isolated multicast scopes and forward traffic among them.

For example, in the above scenario, A, B, and C form one TVIF, while C, D, and E might form another. In this case, if we ensure that the multicast address ranges for the overlay scopes that define two TVIFs are disjoint, then C can efficiently forward traffic between the two regions. In effect, two hash functions, say h1 and h2, would map overlay groups to native groups in the two TVIFs. Thus, C would forward a packet addressed for overlay group G from the first TVIF to the second TVIF by receiving packets sent to the native group h1(G) and forwarding those packets to the native group h2(G). (As explained later, the overlay router performs several important checks to ensure that the traffic is received in congruence with the routing state so as to avoid traffic loops and so forth.)

Because multiple overlay groups may, in general, hash to the same native multicast group, there is a potential for address collision. However, these sorts of collisions merely result in bandwidth inefficiency and do not cause packets to be incorrectly routed. The reason for this is that the forwarding logic in an overlay router is based on the overlay address carried in the overlay header, not on the native, network-layer address. Thus, the next-hop native multicast address need not be unique. The only adverse affect of a collision is that traffic may flow to an overlay router that has no interest in receiving that traffic thus wasting network bandwidth. In effect, we have a tension between the size of the address block used (and hence the amount of group-state stored in the native multicast routers) and the bandwidth-efficiency of the scheme.

2.2.4 Unicast-Bank VIFs

To support clients without direct multicast connectivity (which may be the predominant form of interaction with an overlay network into the indefinite future), the overlay multicast service interface includes a mechanism whereby clients can communicate directly with an overlay router over UDP unicast. Here; an end-host contacts the overlay router through some application-specific fashion (e.g., a Web request for a video stream) and establishes group membership for a particular overlay group. The setup state, including the overlay group in question, is specified in the connection setup process, e.g., the overlay group could be embedded in a Web URL and HTTP could be used within an overlay router to accept requests from senders and receivers to attach to the overlay network.

Because of the transparency of the OMN infrastructure, end clients would not normally know how and when to connect to an overlay router. Thus, redirection can be used (as in HTTP) to redirect a given client away from the origin server that advertises streaming content, say, to a nearby overlay router. A content-aware redirection server can be used to map an IP address, for instance, to a nearby overlay router. Alternatively, in a reverse-proxy streaming configuration, the end client could be redirected to one of a large number of overlay routers at a centralized broadcast site arranged in a cluster for load balancing.

There are two types of unicast-bank VIFs (UVIF): unidirectional and bi-directional. In the unidirectional variant, clients cannot send traffic into the OMN (though they can send application-specific feedback to the incident overlay router), whereas in the bi-directional variant, clients can in fact do so. The former case is well matched to one-to-many applications like broadcast streaming media, while the latter case is appropriate for many-to-many applications like video conferencing.

As a practical concern, the unidirectional case scales more gracefully than the bi-directional case because the packet replication process can occur after the management and routing decision. That is, a unidirectional UVIF can simply "machine gun" a copy of a given packet to all the end-clients subscribed to the given group, rather than schedule and process each such packet individually (thus necessitating copying and allocating memory for this function). The bi-directional case, on the other hand, provides richer control because it allows for fully meshed intercommunication in a bandwidth-managed fashion.

Group membership is implied by the presence of the unicast end client. When the client requests attachment to a given overlay group, the incident overlay router treats the client as in the LVIF case and propagates group membership state as needed to initiate reception of traffic sent to the overlay group in question. The group membership state is timed out using various heuristics and application-level hints. For example, if the overlay router begins to receive port unreachable or host unreachable ICMP messages, then the flow will be terminated and the overlay group unsubscribed to (unless there are other hosts receiving said group's traffic through the UVIF). Alternatively, if the client uses TCP control connection to initiate the UDP flow—as does the Real-time Streaming Protocol (see, RFC2326), then the presence of the persistent TCP connection can be used to wire down the group state. Once the connection is closed or aborts, the state can be expired and the group relinquished.

3. Application Shims

Unlike the IP Multicast service model—where senders do nothing more than transmits packets to a group address—the OMN forwarding infrastructure requires that a source announce its presence on a well-known, domain-wide control group (i.e., via DGMP) or signaled directly to an overlay router via SSP. If the end-hosts were OMN-aware, these control messages could be generated directly by the host. However, to maintain compatibility with existing applications and reduce the burden on application developers, the OMN architecture assumes that some other agent in the network can generate these messages on behalf of the sending application. An agent that provides this type of middleware glue is referred to as a "shim".

Applications like the Real Networks G2 Server, Microsoft Netshow, Cisco IP/TV, and the MBone tools can bridge into an overlay network by building shims around the applications. The shims configure the tools appropriately and signal overlay group setup information to a nearby overlay router using the techniques described above. A shim can be a nontrivial application and export a sophisticated user interface. For example, a broadcast control center could be built that provides the OMN signaling information to bridge between a bank of RealNetworks G2 servers and a cluster of overlay routers arranged in a mesh.

Note that there is no pressing need for a specialized shim on the receive side of an application. For example, if a receiver joins through a UVIF, the overlay router is directly informed of all required control information. Likewise, if an unmodified receiver application joins a multicast group, an agent on the attached LAN can snoop the IGMP traffic and relay appropriate DGMP signaling information to the designated overlay router in a generic fashion. That is, the receiver need only specify its presence and interest for a group and need not provide any additional signaling state. Shims are not necessary in all applications but can be used to perform a web redirection process, as desired.

4. The Plugin Framework

Because overlay routers are situated at points of administrative disconnect and bandwidth heterogeneity and because they are application-aware, they provide a strategic vantage point for carrying out traffic management that accounts for locally and globally defined administrative policies as well as the semantics of the underlying data flow. Traffic management in multicast is especially difficult because the receivers for a given group may be situated along a heterogeneous set of network paths thus preventing a source from simply sending a packet flow to all receivers at the same rate. To solve this problem, the OMN architecture includes a traffic shaping stage that is applied to each overlay group's packet stream before it is transmitted over a virtual link in the overlay network. To effect this functionality, a hierarchical class-based bandwidth allocation scheme apportions the available bandwidth across a set of application-level processing agents, called plugins, that manage each group's packets.

The plugin framework transforms an overlay router into a-flexible and extensible platform for migrating application-level functionality into the network in a safe and restricted fashion. Each media flow is bound to an application-level handler, called a plugin, that can flexibly transform, thin, or otherwise control the flow it manages. The plugin data path is tightly integrated with forwarding semantics of the application data and adheres to the policy constraints imposed by external management and configuration tools. In a nutshell, plugins are application-level entities that are situated in the forwarding path of the overlay routers. Feedback from the packet scheduler informs the plugin of congestion and/or bandwidth availability, thereby allowing the plugin to best utilize available network resources in a tightly controlled fashion.

For example, a plugin might perform stream thinning within the network according to the bandwidth throughput it attains from the bandwidth allocator. If a media flow is represented as a number of simulcasted sub-components, each at a different bit-rate and corresponding quality, then the plugin could forward the maximum number of streams that the bandwidth policy permits, thereby accommodating bandwidth heterogeneity from within the network infrastructure.

To maximize the efficacy of the application-level adaptation capability afforded by the plugin framework, the scheduler that controls the transmission of packets across VIFs explicitly communicates with the plugin to adjust its rate. By providing' specific feedback as to what rate the plugin can expect to achieve on each output link, the plugin can adjust the rate of the flow it manages to fit into its allotment.

The plugin framework is extensible. As new applications are introduced into the network, the overlay broadcast infrastructure can be easily and incrementally upgraded by dynamically downloading plugins that handle the new traffic types as needed. Abstractly, plugins execute in a "sandboxed" process context and intercommunicate with the overlay router through a narrow application-programming interface called the Plugin API. We can think of the overlay router plugin abstraction as an analog to Web browser plugins. Just as a browser plugin is selected based on a Web object's Multi-Purpose Internet Mail Extensions ("MIME"—see RFCs 1521 and 1522) type, the overlay router plugin is selected according to the traffic flow type signaled via MINT.

Given the goals of this plugin bandwidth management framework, a number of problems must be solved. First, packets must be classified, that is assigned to a certain traffic category, so that traffic can be managed in a policy-oriented fashion. Second, bandwidth must be allocated and shared among application specific processing agents. Third, packets must be actively scheduled to ensure that the traffic class policies and bandwidth allocations are adhered to. Finally, bandwidth policies must be defined, administered, and attached to the virtual links in the network.

5. Routing

A collection of overlay routers forms a logical, overlay network that provides the conduit for efficiently distributing media flows using the multicast forwarding techniques described herein. However, in order to properly forward packets across the overlay network, the overlay routers must know how to route packets across the network such that all interested receivers receive a single copy of each packet and no traffic loops arise. To this end, the OMN architecture must carry out two fundamental routing tasks:

the overlay network must compute efficient spanning-tree routes for multicasting packets from every potential source to every potential receiver, and the network must track group membership along the distribution tree to prevent multicast traffic from flowing where it otherwise is not needed.

Rather than invent new routing protocols from scratch, the OMN architecture leverages existing multicast routing technologies that compute spanning trees and track group membership in a scalable fashion, but at the application layer rather than the network layer. The core approach is based on the Border Gateway Multicast Protocol (BGMP), but we simplify the so-called "rendezvous problem" (see below) by explicitly including the rendezvous point in the upper 32 bits of the overlay group address. To scale the routing infrastructure, overlay routers may be clustered into routing "broadcast hubs", where the routers that comprise the hub are interconnected with a high-speed multicast-capable LAN. Hubs, in turn, are interconnected across the wide area. In this way, traffic can be load-balanced between wide area hubs by spreading groups (i.e., broadcast channels) across multiple overlay routers. Likewise, unicast join requests can be distributed evenly across a broadcast hub to balance the load of an arbitrary number of client viewers.

7.1 Multicast Routing Background

The fundamental problem in multicast routing is to build up state in the network that interconnects each source with every interested receiver via some sort of routing tree. This is typically called the "rendezvous problem", i.e., how multicast' receivers and sources find each other in a scalable distributed fashion. Roughly speaking, there are two fundamental approaches to this problem: (1) broadcast traffic everywhere and prune it back from regions of the network where there are no interested receivers, and (2) broadcast traffic toward a core and have receivers join a broadcast channel by sending control messages to that core.

Unfortunately, "broadcast and prune" is quite unscalable since traffic goes everywhere in the network. On the other hand, anchoring a tree at a core (or "rendezvous point") in the network is more scalable but has the disadvantage that the participants must know where the core is (or the network must maintain a mapping from multicast group addresses to cores). A number of ad hoc approaches for this have been proposed in the research literature (for CBT and SM-PIM), but BGMP takes a novel approach where multicast addresses are bound to source domains. In this model, the network maintains a distributed mapping between multicast addresses and source domains. A key novelty in BGMP is to represent this mapping as a set of routes. That is, each BGMP domain is configured with one or more blocks of multicast addresses and that BGMP domain advertises these blocks (via scalable prefixes)

across the BRs using a routing protocol like M-BGP, a Border Gateway Protocol for exchanging routing information between gateway hosts. The effect is that each border router then knows the shortest path toward the "owner domain" of a given block of multicast addresses. Thus, when a border router receives a join message for a given group, it can consult this auxiliary routing table to propagate the join toward the source domain and record or modify the "local view" of the multicast spanning tree in a forwarding table (the Forwarding Information Base or FIB). In short, the M-BGP routing table is used exclusively to set up the bi-directional tree and once the tree state is established in the FIB, the border router consults only the FIB to make forwarding decisions. In BGMP terminology, the source domain is called the "root", the routing table of multicast address blocks is called the "multicast RIB", and the forwarding table constructed from join/leave BGMP messages (which are routed via the RIB) is called the "tree state table".

Given that this scheme relies upon each root domain owning some set of multicast address blocks, the natural question arises as to how these addresses are allocated in a decentralized, robust fashion. To this end, BGMP proposes that some companion protocol issue address blocks dynamically across domains in a hierarchical fashion. The Multicast Address Set Claim (MASC) protocol has been proposed to serve this function for BGMP. The basic model in MASC is to arrange domains into a hierarchy and have children domains request blocks of multicast addresses from their parents, which in turn requests larger blocks from their parents, and so on up to some top-level domain that owns the entire multicast address space. The address blocks are claimed and released using timeouts in a fashion similar to how Dynamic Host Configuration Protocol (DHCP—RFC2131) allocates temporary IP addresses in a local network.

Unfortunately, the dynamic approach to address allocation taken by MASC introduces substantial complexity and potentially hard-to-predict dynamics. It is also not clear how top-level addresses will be arranged or what incentives will be in place to prevent sub-domains from requesting too many addresses. Moreover, the architecture relies upon address allocation preemption, where if a parent domain reclaims a block of addresses, all the applications that are using that address must perform reallocation, presumably in some synchronized fashion. In addition, this framework is complicated by the fact that address blocks will become fragmented over time as applications allocate and release addresses from the various available blocks. In short, maintaining a decentralized, robust address allocation architecture, especially in the face of intermittent connectivity that is so commonplace in the Internet, appears to be fragile and difficult to deploy. Fortunately, these problems can be quite easily overcome if the address architecture can be changed (and since we are building a new overlay network infrastructure, this is easily done). By using a 64-bit address for the broadcast channel address, the IP address of the. core can appear explicitly as the upper 32-bits of the overlay address.

The beauty of embedding prefix-based root domains in a larger address is that the resulting scheme is completely compatible with the BGMP multicast RIB because the root domain prefix is simply treated as additional bits of the multicast address. And the M-BGP style aggregation of multicast address blocks only requires a route computation that effectively uses root domain identifiers instead of multicast address blocks (because they are one in the same). In short, the RIB is a routing table that gives shortest path routes to the rendezvous points and has no dependence per se on overlay group addresses.

In light of this discussion, the OMN architectural components for overlay multicast routing are based on:
a path-state routing (PSR) protocol to compute shortest-path routes toward the rendezvous point, and
an overlay group membership (OGMP) protocol based on BGMP to track group membership across the OMN.

7.2 Path-State Routing Protocol (PSR)

In order to effectively build the multicast spanning trees, each overlay node must know the next hop along the shortest path from that node to the rendezvous point. That is, spanning trees are incrementally built up as group membership requests (graft and prune messages) are sent toward the rendezvous point according to the group's route. Thus, overlay routers run a distributed routing algorithm to compute these shortest paths.

As in BGMP, the OMN architecture exploits a path-state routing protocol to compute such routes. Any node in the overlay network may be configured as the rendezvous point for some set of overlay address prefixes (i.e., which may be the unicast address prefixes of the particular set of hosts within its domain). Once so configured, a node advertises "reachability" to that rendezvous point via itself. In turn, its directly attached neighbors propagate this reachability information to its neighbors and so forth. As in BGP, each advertisement includes the entire path of nodes to which the route corresponds, which allows the system to easily detect and avoid potential routing loops, and allows administrative policies to control how routes are filtered and propagated. As described above, the OMN architecture accounts for and optimizes the case that transit domains are implemented using native multicast. That is, overlay routers forward packets to a group of peer routers simply by transmitting a single copy using native multicast. This, however, has no bearing on the path-state routing computation since this method of forwarding is isomorphic with that of unicasting a copy to each peer. And, in the overlay topology, each peering relationship across a multicast transit VIF is managed as if it were a separate, point-to-point connection.

7.3 Group Membership

When a host joins (or leaves) an overlay group at the edge of the network, group membership state must be reflected into the network in a scalable fashion. The Overlay Group Management Protocol (OGMP) carries out this function by tracking group membership requests at an overlay node and propagating them as necessary to the appropriate peers based on the PSR routing data base.

As in BGMP, the OMN architecture effects group membership through a graft/prune protocol. When a host joins a group, a join message is sent toward the rendezvous domain (which is explicitly given in the join request) using PSR routes. As soon as the join messages reaches a router that is already on the tree, the message stops. The message is sent hop-by-hop toward the rendezvous point across a TCP control connection that manages the peering relationship of each pair of overlay nodes. As in BGP and BGMP, the use of TCP connections provides reliability and flow control and thereby simplifies the routing protocol.

Likewise, when a source joins a group, a join message is sent toward (and all the way to) the rendezvous point. This implies that traffic flows to the rendezvous point even if it is not necessary to do so to reach all interested receivers. A future version of the group membership protocols may be more sophisticated and avoid this condition.

7.4 Loop Avoidance

A standard problem in both unicast and multicast routing protocols is traffic loops that are caused by inconsistent views of the routing database at different points in the network. This problem could potentially be exacerbated by the application-level nature of the OMN architecture and the interaction of the application-level routing infrastructure with the underlying network-level multicast layer. In this section, we discuss this interaction and argue that the OMN architecture is in fact robust against looping pathologies.

One challenges posed by the OMN architecture is that the underlying multicast regions used to glue together distinct multicast transit VIFS might not be completely partitioned from One another simply because such isolation might be hard to configure (and in fact is difficult to automatically ensure). Thus, we could end up in a situation where an overlay router R receives a packet say from multicast TVIF V1 and forwards it to TVIF V2 (out a separate physical interface). But if for some reason these two domains overlap physically, then the packet forwarded to V2 would reappear on domain V1 and R might forward it again creating a routing loop.

Fortunately, the application-level nature of the OMN leads to an easy solution for this problem whereby we leverage the peering relationship that already exists among overlay routers. As such, a router forwards a packet only if it arrives from one of its peers within the appropriate transit VIF. That is, a router accepts a packet only if it came-from a peer router that it expected it to come from (which it can check since, unlike network-layer multicast, the peer's IP address appears explicitly in the packet). Thus, in the case above, R would see that the second copy of the packet from VIF V1 had originated from itself and therefore drop it. Note that this scheme generalizes correctly to indirect loops involving multiple VIFs because the set of peers incident to a multicast VIF are configured into each overlay node.

The other case of concern is when an overlay router accepts a packet from a multicast leaf VIF. Here, the router must be sure that the source of the packet is an end host and not another overlay router (that, for instance, might be leaking packets into the leaf domain coincidentally). Since the OMN architecture requires that senders explicitly signal their presence using SSP, the overlay router knows whether any given packet is from a legitimate sender in that leaf VIF. Note that this is another example where routing at the application layer provides a simple solution to hard problems—since the routers appear explicitly in the forwarding function we can easily detect loops using simple consistency checks.

7.5 Black Hole Avoidance

One of the major difficulties of interoperability between multicast routing protocols is to ensure that disparate routing entities agree on the overall multicast routing tree for any given group. That is, when a packet crosses a routing domain, it must enter the new domain at a point that is topologically matched to that domain's view of the distribution tree. Yet, if the outer-domain protocol has an alternate viewpoint, the packet arrives at the wrong location and is dropped. A substantial fraction of the complexity of the BGMP protocol specification has to do with making sure this mismatch is properly handled for the various multicast routing protocols that exist.

However, just as application-level routing made the loop avoidance problems easy, it likewise provides an easy solution for avoiding black holes. Because network layer addresses are rewritten on each hop through the OMN, there is no need for overlay routers to ensure that the leaf domain multicast routes are congruent with the OMN world view. That is, when a packet is injected into a leaf or transit multicast VIF, the IP source address corresponds to the overlay router not the original source. Thus, black holes cannot occur because this traffic is routed exclusively against local rules in the containing overlay scope, which are not susceptible to any wide-area state.

A disadvantage of this approach, however, is that the original source address does not survive in tact and thus a multicast receiver has no direct means to identify the address of the origin. Instead, the OMN model assumes that transport-level protocols either provide their own mechanisms for source identification (as in RTP): or that applications are agnostic to the origin address (as with streaming media players from Microsoft and RealNetworks).

Transaction Example in the OMN Architecture

Next, a description of hardware suitable for use with the present invention is presented, followed by a detailed walk-through of information transactions using the overlay approach of the present invention.

Description of Hardware

Figure 3A:
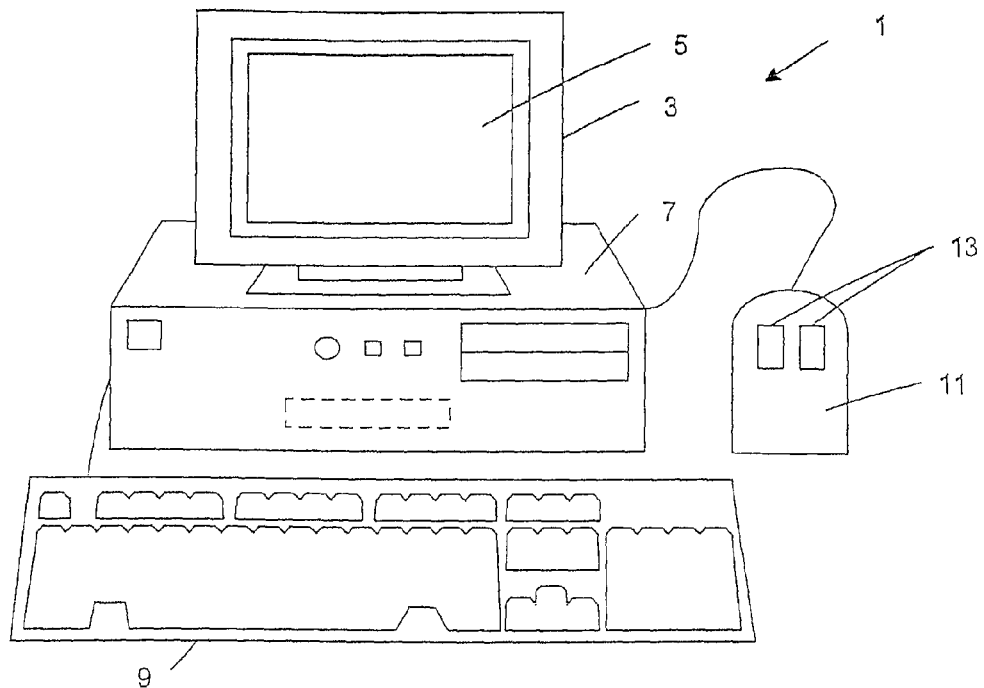
FIG. 3A shows a computer suitable for use with the present invention.

FIG. 3A is an illustration of computer system 1 including display 3 having display screen 5. Cabinet 7 houses standard computer components (not shown) such as a disk drive, CDROM drive, display adapter, network card, random access memory (R.AM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

Figure 3B:
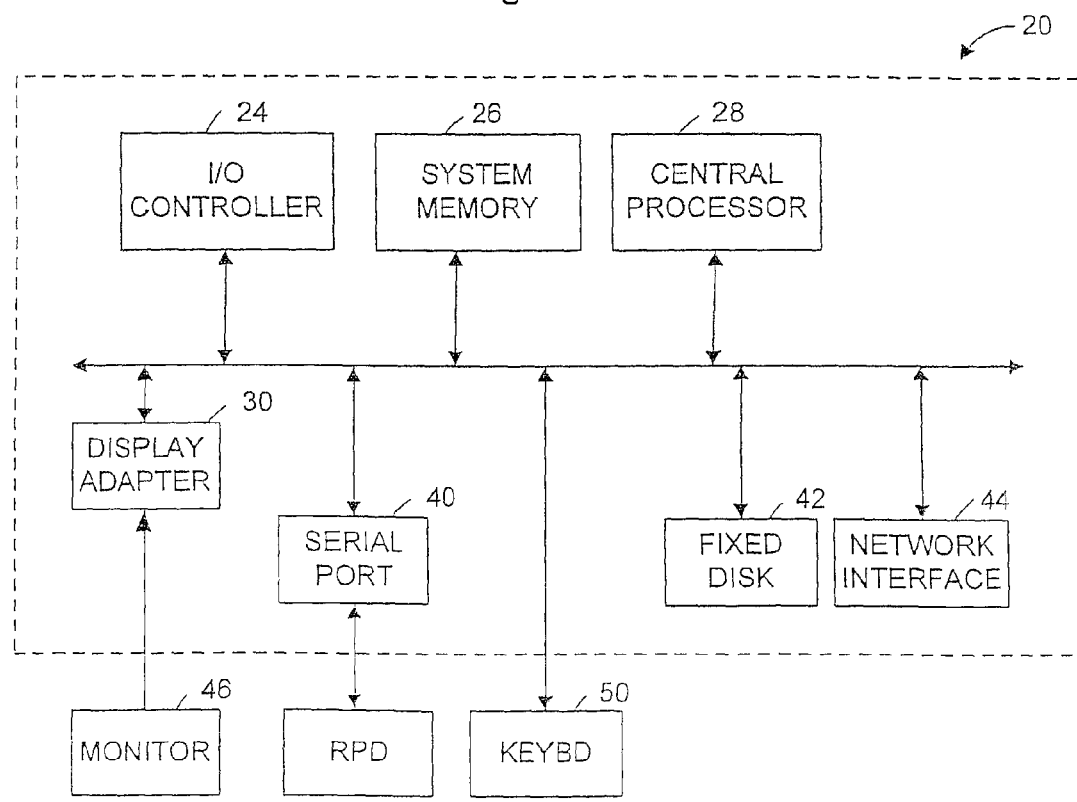
FIG. 3B show subsystems in the computer of FIG. 3A.

FIG. 3B illustrates subsystems that might typically be found in a computer such as computer 100.

In FIG. 3B, subsystems within box 20 are directly interfaced to internal bus 22. Such subsystems typically are contained within the computer system such as within cabinet 7 of FIG. 3. Subsystems include input/output (I/O) controller 24, System Random Access Memory (RAM) 26, Central Processing Unit (CPU) 28, Display Adapter 30, Serial Port 40, Fixed Disk 42 and Network Interface Adapter 44. The use of bus 22 allows each of the subsystems to transfer data among the subsystems and, most importantly, with the CPU. External devices can communicate with the CPU or other subsystems via bus 22 by interfacing with a subsystem on the bus. Monitor 46 connects to the bus through Display Adapter 30. A relative pointing device (RPD) such as a mouse connects through Serial Port 40. Some devices such as Keyboard 50 can communicate with the CPU by direct means without using the main data bus as, for example, via an interrupt controller and associated registers (not shown).

As with the external physical configuration shown in FIG. 3A, many subsystem configurations are possible. FIG. 3B is illustrative of but one suitable configuration. Subsystems, components or devices other than those shown in FIG. 3B can be added. A suitable computer system can be achieved without using all of the subsystems shown in FIG. 3B. For example, a standalone computer need not be coupled to a network so Network Interface 44 would not be required. Other subsystems such as a CDROM drive, graphics accelerator, etc. can be included in the configuration without affecting the performance of the system of the present invention.

Figure 3C:
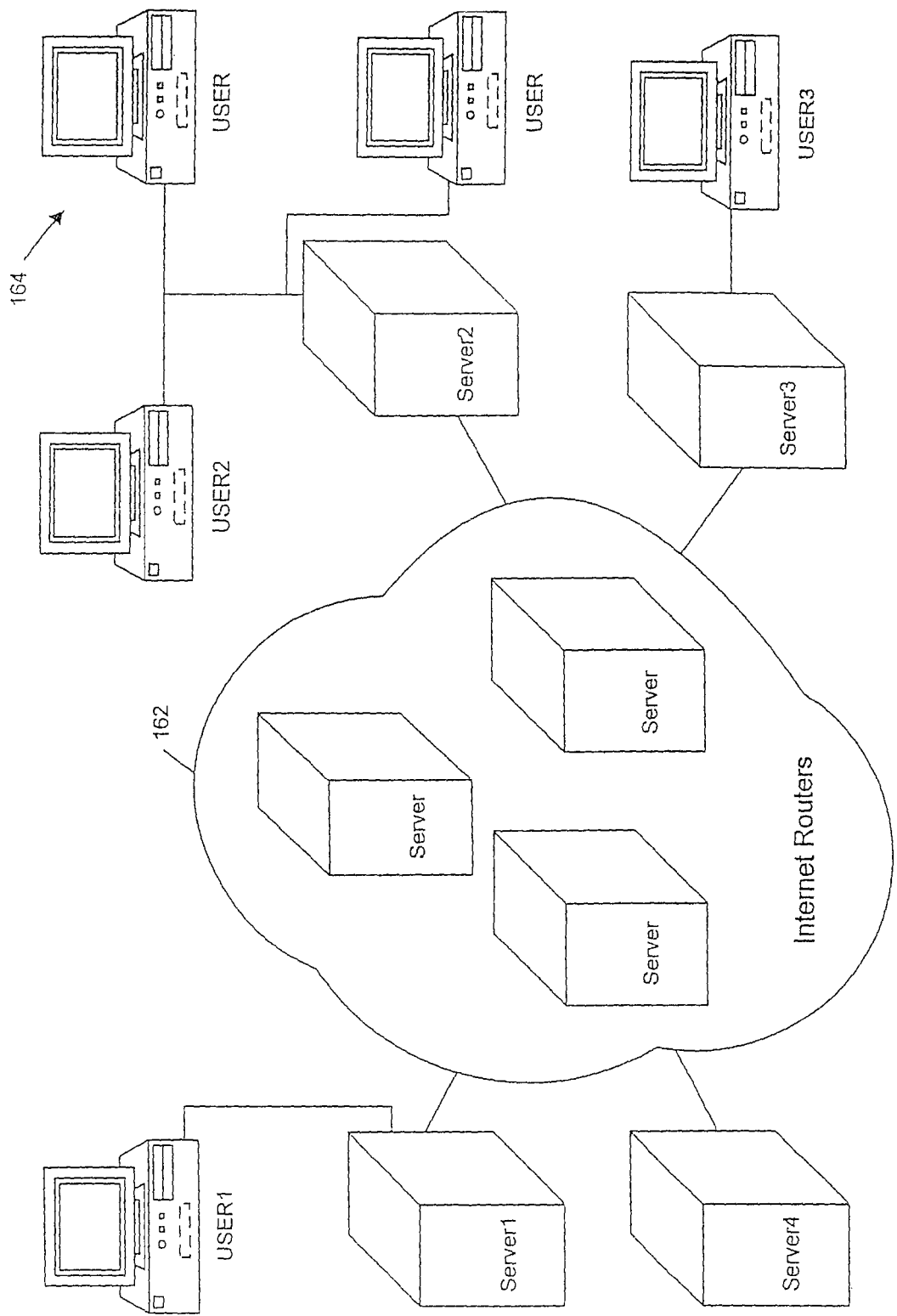
FIG. 3C illustrates a network configuration.

FIG. 3C is a generalized diagram of a typical network.

In FIG. 3C, network system 160 includes several local networks coupled to the Internet. Although specific network protocols, physical layers, topologies, and other network properties are presented herein, the present invention is suitable for use with any network.

In FIG. 3C, computer USER1 is connected to Server 1. This connection can 15 be by a network such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 162. Note that the use of the Internet for distribution or communication of information is not strictly necessary to practice the present invention but is merely used to illustrate a preferred embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line.

Similarly, other computers at 164 are shown utilizing a local network at a different location from USER1 computer. The computers at 164 are coupled to the Internet via Server2. USER3 and Server3 represent yet a third installation.

Note that the concepts of "client" and "server," as used in this application and the industry, are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information) and can be acting as a server at another point in time (because it is providing information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines. A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine.

Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet. Although software of the present invention, such as the MediaBridge software, may be presented as a single entity, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction.

Figure 4A:
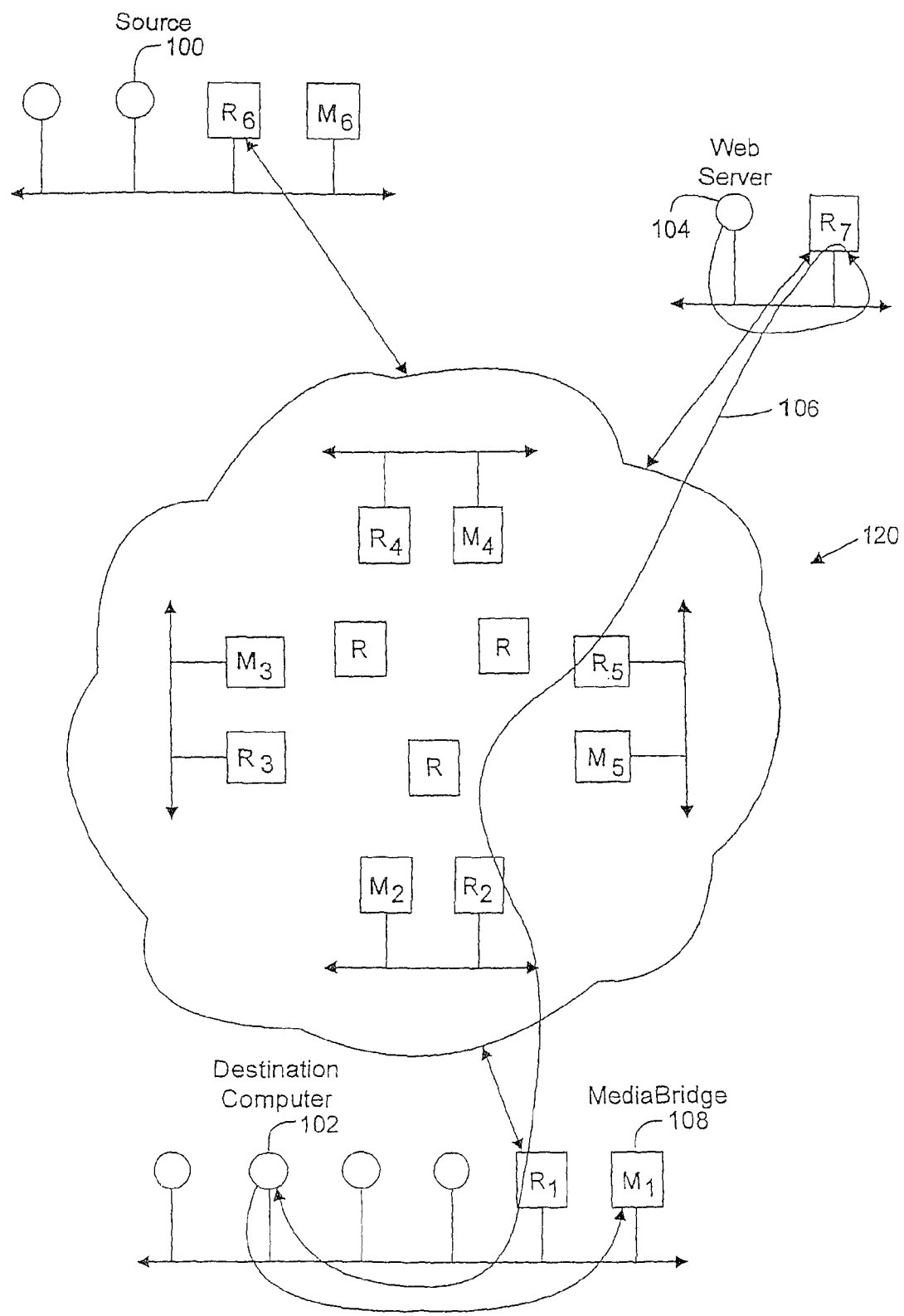
FIG. 4A shows a unicast-initiated overlay routing step.
Figure 4B:
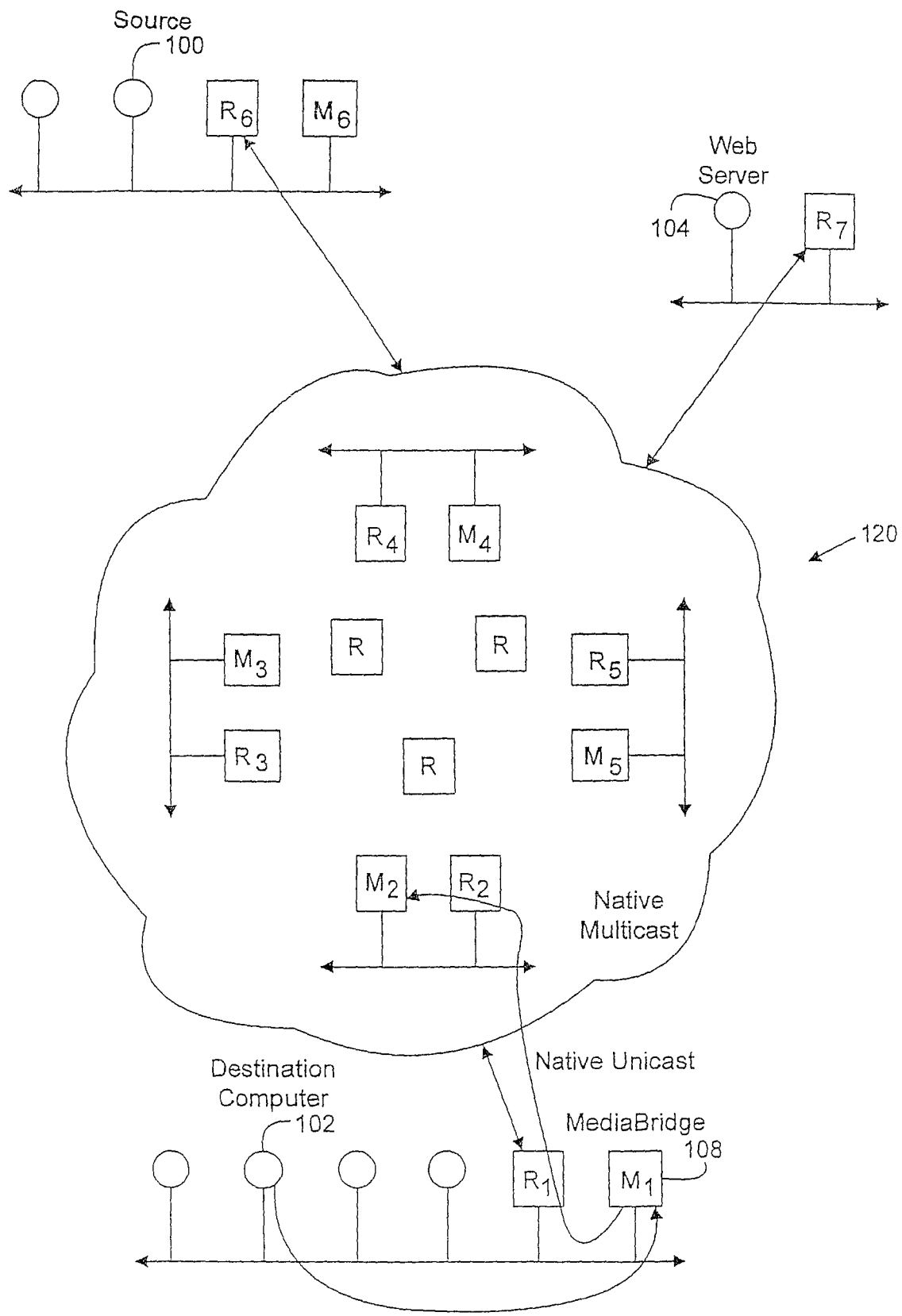
FIG. 4B illustrates a second step in overlay routing.
Figure 4C:
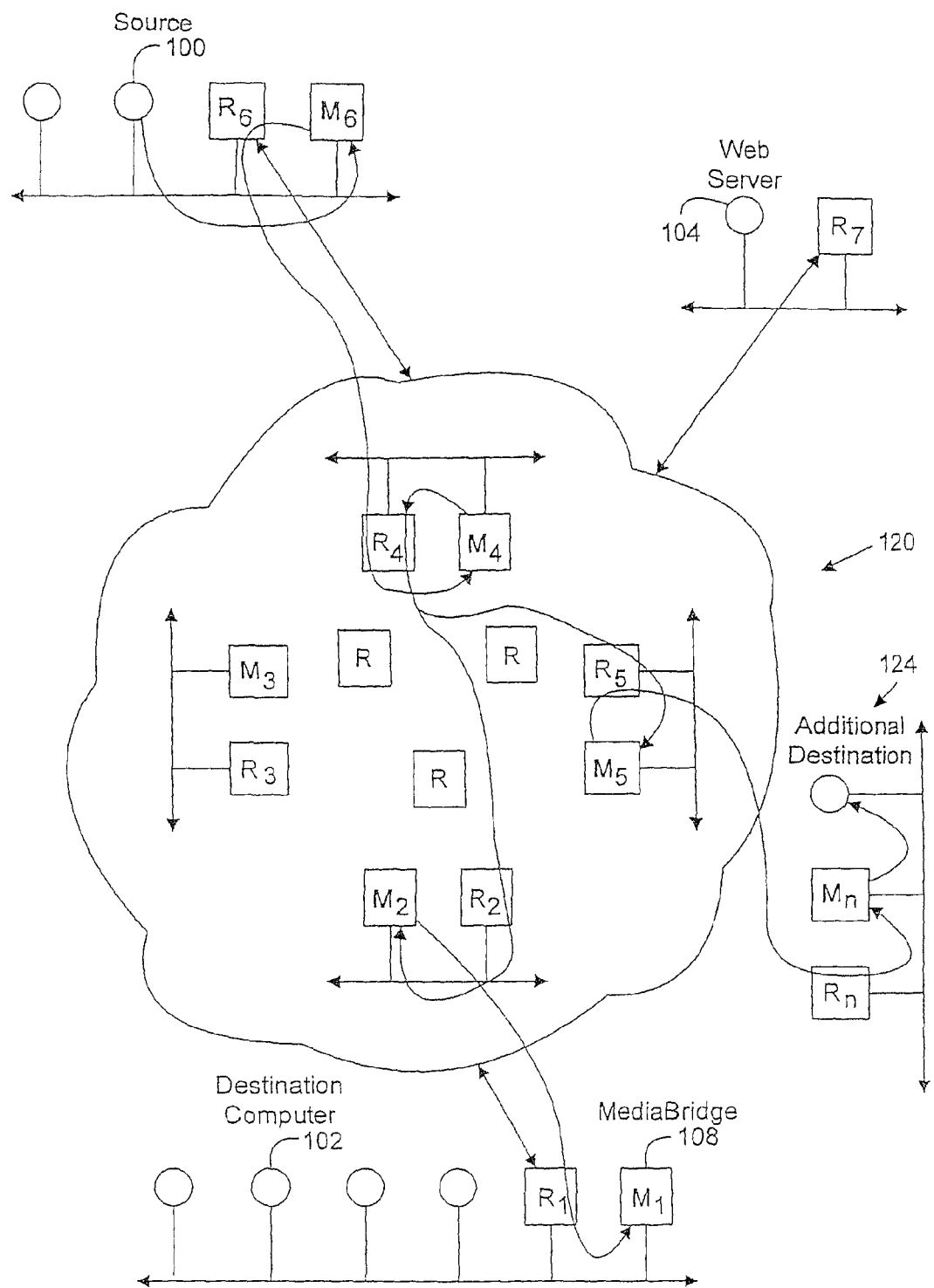
FIG. 4C illustrates a third step in overlay routing.

FIGS. 4A-C are next discussed to present two examples of initiating and maintaining an overlay multicast from a content source to a requesting destination computer. The two examples differ only in the manner in which the destination computer makes a request to be included as a recipient of the multicast content information. In the first example, the overlay multicast is initiated by a unicast request from the destination computer. In the second example the overlay multicast is initiated by a native multicast request from the destination computer.

In the Figures, an "M" in a box indicates a MediaBridge computer that handles the overlay routing of the invention as discussed above. An "R" in a box indicates a router, such as a typical router on an intranet, the Internet, or other network where the router manages the flow of information to, and from, a local, or otherwise defined relatively self-contained, network that is connected to other networks which are also managed by associated routers. In the Figures, one router is assumed to manage a single local area network (LAN) and one MediaBridge computer is assigned to each network that can receive overlay multicast information, or that can act as a router for overlay multicast information, according to the present invention. MediaBridge computers are not strictly required on every LAN. Unicast attachment with the network allows a MediaBridge to be situated arbitrarily far from the client but, in general, the closer proximity of MediaBridges to clients aids in overlay routing. As discussed above, MediaBridge computers form an overlay network where the computers are in a peering relationship with each other. MediaBridge computers maintain tables of overlay groups which are updated via a membership protocol. The tables are used to route information between the MediaBridge computers according to subscriptions, or memberships, to the overlay groups. Critical to the routing is a mapping of overlay groups to native groups by using the tables.

FIGS. 4A-C show more detail than in FIG. 2 by depicting individual end-user, or "host," computers, routers and MediaBridge computers; but otherwise show the same architecture as in FIG. 2. For example, group of networks 120 is a "transit domain" as depicted in FIG. 2 while the other LANs can be considered "leaf domains" as discussed above. Across transit domains native multicasting is preferably used to achieve overlay forwarding through unicast, peer-to-peer or other types of prior art routing can be used to achieve the overlay routing. Note that the specific topology, interconnections and number and type of devices shown in the Figures is only for purposes of illustrating the following examples, it should be readily apparent that many arrangements of computers, routers, wide or local area networks, physical links, or other processing devices or communication structures may be used with the invention.

FIG. 4A shows a unicast-initiated overlay routing aspect of the present invention.

In FIG. 4A, the goal is to have streaming media information, such as video program digital data including image and audio information, originate from source computer 100 to be received by destination computer 102. Naturally, many other destinations will exist in a typical multicast of information.

The same mechanisms and techniques discussed here with respect to the single destination 102 can apply to any number of destinations. Because of the use of an overlay address and mapping protocol, the system of the present invention scales easily without requiring changes to existing network software and hardware.

Although the invention is discussed with respect to multicasting of streaming media information, any type of information can be distributed over a network by using the techniques of the present invention. For example, Internet distribution of software applications and updates, stock quotes, web pages, web cache updates, news, etc., can all be distributed more quickly, more efficiently, and with more control and monitoring by using the techniques of the present invention.

The present invention allows each potential recipient of a multicast to explicitly request the information. Such a request can be performed by the selection of a human user at the requesting computer, can be initiated automatically by a computer, or can be achieved by other means.

FIG. 4A shows the case where the receipt of multicast information is initiated by a unicast manner in response to a user's request. Specifically, destination 102 is a desktop computer operated by a user who is browsing web pages. In general, any type of computer running any number of applications, operating systems, user environment, etc., is suitable for use with the present invention. The web page that the user is currently viewing on the desktop computer is "served" by web server computer 104. Web server 104 stores, and serves, information to other computers, such as destination computer 102, in the form of web page content, hyperlinks (i.e., uniform resource locators or "URLs") and other formats.

In the present example, the link of interest is a link to receive the streaming media video production which is to be provided by source computer 100. The data from source computer 100 may already be streaming when destination computer 102 makes a request for the stream. Preferably, source computer 100 registers its channel with the overlay network so that other MediaBridges and web servers "know" how to associate an overlay channel with the data stream. For example, a directory services table can be maintained by web server 104 so that web server 104 can carry out the redirection process for a published channel. When the user of destination computer 102 chooses to receive the video program, e.g., by clicking on a link, web page graphic, symbol or other control, web server 104 transfers information on how to subscribe to the video program as shown by the path 106. In the preferred embodiment, the transactions between destination computer 102 and web server 104 are governed by HTTP/TCP. However, it should be apparent that the invention is adaptable to a variety of different network communication protocols and standards.

Web server 104 returns the identification for MediaBridge computer 108 (referenced as $M_1$ in FIG. 4A) to destination computer 102. Web server 104 makes the decision to have destination computer 102 route through MediaBridge computer 108 since web server 104 is provided with information associating computers on the Internet with optimal MediaBridge computers. In the preferred embodiment, the optimal MediaBridge computer that a destination computer will use is generally the MediaBridge computer closest in proximity to the destination computer. Proximity can be a factor of both geographic distance and the electronic network path between the destination and MediaBridge computers.

In the present example, web server 104 is provided with information on making the association between a destination computer and a MediaBridge computer as, for example, where a table in web server 104 associates one or more destination computers with a specific MediaBridge computer. Note that it is possible to have such associations performed by another computer rather than the web server. For example, a MediaBridge, or other computer, connected on a local area network to web server 104 can be used. Also, the computer making the destination computer and MediaBridge computer association can be remote from web server 104, although the web server requires access to the mapping table to redirect destination computer 102 correctly.

In a first approach to connecting destination computer 102 to the media stream, web server computer 104 can provides an overlay channel identifier to destination computer 102. The channel identifier is used by the various MediaBridge computers to route the proper content to a destination computer. The channel identifier, or channel address, is 64 bits in the preferred embodiment. A channel name is used in the LTRL and is mapped to a corresponding channel ID as part of the redirection process. Optionally, other information can be provided by the web server. Such additional information can be used either by destination computer 102 to make the subscription request, or can be used by a MediaBridge computer to service subscription requests and to provide efficient multicast relaying. For example, statistics can be kept about the requesting user's computer, geographic location, etc. This can be used for demographic analysis, to make predictions about the destination computer's ability to process data at a sufficient bandwidth, or for other reasons.

Once destination computer 102 has been provided with the appropriate MediaBridge computer address and channel identification information the destination computer makes a subscription request to MediaBridge computer 108.

FIG. 4B illustrates a next major step in the setup for overlay routing in the present example.

In FIG. 4B, once destination computer 102 acquires the subscription information from web host 104, destination computer uses the subscription information to send out one or more packets that indicate that MediaBridge computer 108 is to receive the subscribed channel. In the preferred embodiment, the subscription data includes an identification of the desired channel, i.e., the video program, that is to be received, the destination computer's identification (namely, destination computer 102), and other information. Note that the location of the MediaBridge computer can be different from that shown in FIG. 4B. Specifically, the MediaBridge computer can exist anywhere on the Internet and need not be part of the LAN that the destination computer is on.

Once MediaBridge 108 receives destination computer 102's subscription information, MediaBridge computer 108 uses the overlay channel ID to initiate the subscription process. The subscription process is a combination of the native multicasting network architecture and the overlay multicast architecture as described in detail, above. Ultimately, MediaBridge computer 108 sends one or more packets of information in an attempt to subscribe to the appropriate native multicast group. For purposes of the example, we assume that the appropriate native multicast group to which MediaBridge M2 will subscribe for purposes of handling the overlay routing with region 120 needed by the video program from source 100 to destination 102 is designated as "a." The overlay multicast group that is associated with the native multicast is designated as "A."

In the preferred embodiment, a direct 1-to-1 mapping of native to overlay groups is not possible since a native group uses 32 bits for an address and an overlay address is 64 bits. The upper-32 bits are used to specify a rendezvous point. A rendezvous point lookup algorithm can be locally configured, for example, into an agent that monitors IGMP messages.

Another possibility is to have the rendezvous point selection algorithm provided in a fashion similar to the unicast case where the overlay group address is stored at a MediaBridge by a redirection process (discussed below) and where the client is instructed to natively join group "a."

A second approach to unicast-initiated overlay routing provides a channel name used in the original requesting URL to be mapped to a corresponding overlay group as part of the redirection process. When the client attempts to retrieve the resource identified by this URL, the server generates a response that redirects the client to MediaBridge 108. The client may or may not be explicitly aware of the protocols in use to effect overlay multicasting. If the client is overlay-multicast capable, the overlay group can be included in the response message and the client can connect to MediaBridge 108 using overlay-multicast specific protocols. If, however, the client is not capable of participating in the overlay multicast protocols (e.g., because the client is an existing piece of software that has a large installed base), then the client can communicate with MediaBridge 108 using its existing, unmodified control protocol (e.g., Real-Time Streaming Protocol (RTSP) as specified in Internet-draft for RTSP, Mar. 27, 1997). Since the overlay group may not be transportable through that existing protocol, yet is required by MediaBridge 108 to join the broadcast channel, the server (104) contacts MediaBridge 108 with the overlay channel to use before generating the response to the original Web request from the client (102). As part of the dialogue, the MediaBridge returns a "port" identifier to the server (104), upon which it then awaits the client-specific connection. This allows the server (104) to respond to the client with a message that redirects the client to the subsequent port, thereby ensuring that the requesting client is properly associated with the overlay group temporarily stored at MediaBridge 108.

Figure 5:
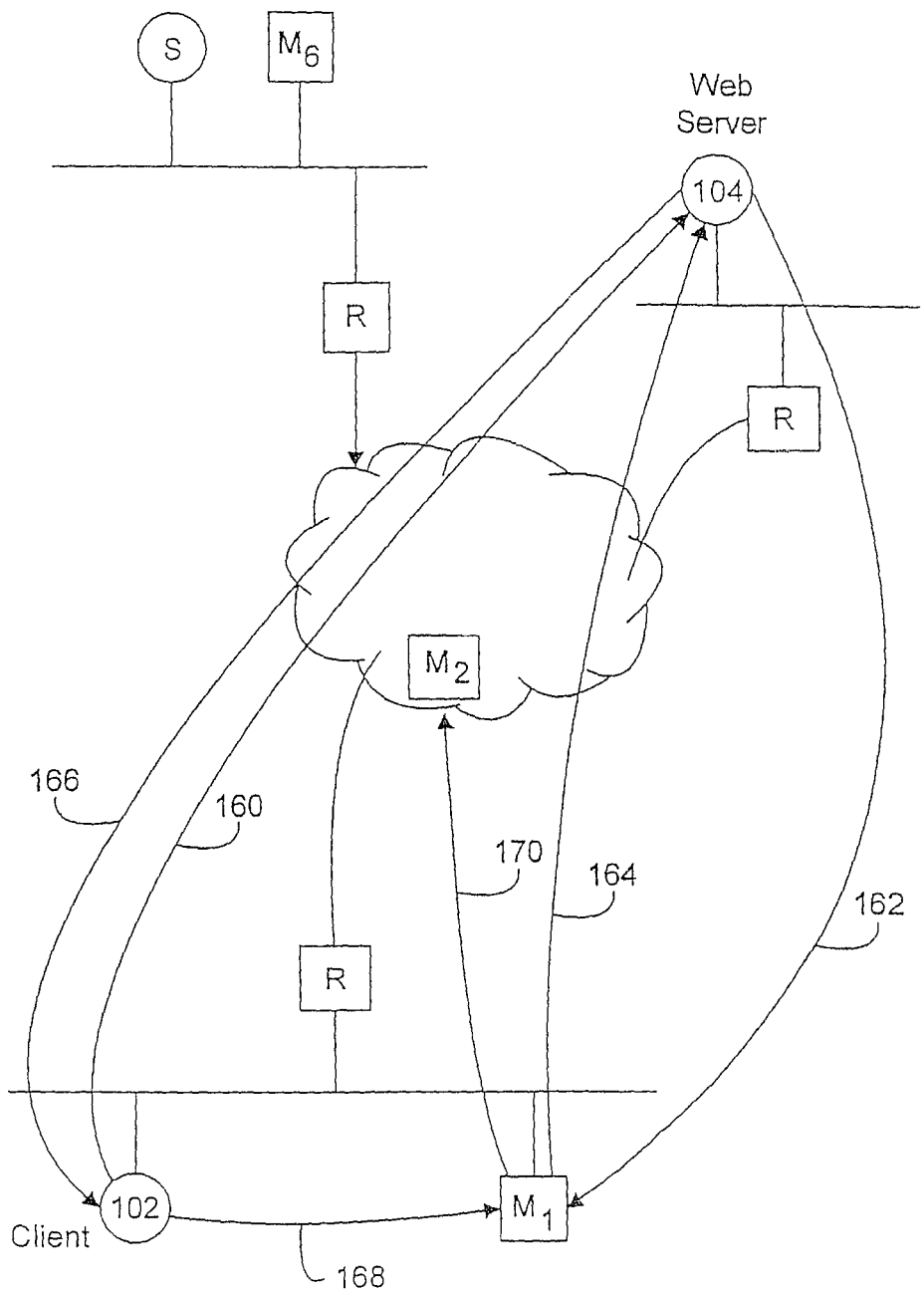
FIG. 5 illustrates a second approach to unicast-initiated overlay routing.

FIG. 5 illustrates the second approach to unicast-initiated overlay routing.

In FIG. 5, which corresponds to FIGS. 4A-C, destination computer 102 makes request 160 to web server 104 via, for example, clicking on a hyperlink to obtain the media stream. Web server 104 deposits state at MediaBridge computer M1 representing the overlay group channel "A" and a streaming media URL, e.g., "rtsp://serverfastforward.com/live/olympics.rm", as shown by path 162. Next, M1 returns to web server 104 an identification that TCP port "p" is the port on which requesting computer 102 should connect as shown by path 164. Web server 104 responds to requesting computer 102 with a message that redirects requesting computer 102 to stream media from M1 over port "p" as shown by path 166. Requesting computer 102 initiates a streaming media protocol, such as RTSP, by contacting M1 over port "p" as shown by path 168. M1 sends a subscription request for group "A" to M2 as shown by path 170. Packets, or portions, of information sent from the content source will then be relayed via the overlay routing to M1 and to requesting computer 102.

The request to subscribe is transferred through router $R_f$ to other routers on the Internet. The subscription request installs a forwarding state in the MediaBridges that indicates which peer MediaBridges are part of the spanning tree for the given overlay channel. An example of a "domain," or "region," of routers and MediaBridge computers is shown at 120 in FIG. 4B. A region is simply a portion of the Internet, or other network, that is logically, geographically or, due to network traffic considerations, that provides efficiencies in multicast distribution when two or more MediaBridge computers implement an overlay network within the region. Within a given region, there is a mapping of each overlay channel to a single native multicast channel. In the preferred embodiment this occurs via a "hash" function, as described above. However, as information is propagated among regions there will typically be different native multicasting channels used for a given portion of information, or packet. For various reasons, the native and/or the overlay channel mappings for a particular multicast stream can change. For example overloading or failures can cause rerouting and remapping of channels.

Ultimately, the MediaBridge computer 108 sends one or more packets of information in an attempt to subscribe to the overlay group in question. The next few paragraphs describe an example of subscribing to an overlay group. The protocol for performing the subscription is called the overlay group membership protocol (OGMP). For the example, the overlay group is designated "A"; likewise, the symbol "a" denotes the native group that is computed from "A" using the overlay scope defined by region 120.

A subscription message is sent from MediaBridge 108 to the peer on the shortest path route, as determined by a path-state routing computation, to the rendezvous point for "A". In this example, we assume the rendezvous point is MediaBridge M6 (it may be any MediaBridge in the overlay network, but it is most efficient to choose the rendezvous point near the broadcast source). Recall that the upper 32-bits of the overlay group represent the IP address of the rendezvous point.

In the configuration show in FIG. 4B, the peer on the shortest path from MediaBridge 108 to the rendezvous point (M6) is the MediaBridge labeled M2. Thus, MediaBridge 108 sends a "subscription request" for the overlay group in question to MediaBridge M2. In turn M2 propagates the subscription message to its peer that lies upon the shortest-path route to the rendezvous point, which in this case is MediaBridge M4. Likewise, M4 sends the request to M6. (These messages are sent reliably using TCP.) Each time a subscription message is received and processed by a MediaBridge, the MediaBridge records subscription information for the group in question and updates its forwarding information base so that when packets are received they can be properly routed to the peers subscribed to said overlay group.

In the case of a multicast transit VIF, the MediaBridge must additionally decide which native group to join using the prior art protocols as a function of the overlay group. For example, when M2 receives the subscription request, it joins the native multicast group "a" in addition to forwarding the subscription request for "A" onto M4. Thus, when M4 receive data packets addressed to overlay group "A", it will forward them into the overlay scope defined by region 120 by transmitting the overlay packet addressed to native group "a". Since M2 is has joined native group "a" using prior art protocols, it will receive said packet and in turn can forward that packet to its downstream peer M1.

After MediaBridge $M_1$ 108 has subscribed to the appropriate native multicast group, "a" in this example, it will receive native multicast transmissions for the group. Once MediaBridge computer 108 has joined the native multicast channel, it begins to receive information for the video program. This is illustrated in FIG. 4C by path 122. Although a specific routing is illustrated in FIG. 4C, naturally any number, and configuration, of routers, switches, servers or other devices can be used. Furthermore, the physical channel can be hardwire; radio-frequency signals, infra red signals, fiber optic light-signals, etc.

Once the overlay group, and group routing tables, information is distributed and stored, data transfer from source computer 100 can proceed accurately. Data is forwarded from source computer 100 to MediaBridge computer $M_6$ receives packets from source computer 100 and adds a header with the overlay group address to each packet. Each packet is then forwarded to $M_4$. $M_4$ multicasts the packets to the native group "a." $M_2$ receives the packets as $M_2$ is listening to native group "a" as a result of the association of "a" with "A" in the tables. $M_2$ forwards the packets to $M_1$. $M_1$ strips off the overlay header and forwards the native packet to the client, destination computer 102.

Naturally, any other computers on LAN 126 are also provided with the same packets if they have subscribed to overlay channel "A." Thus, this approach of overlaying a multicast channel designation onto an existing native multicast channel designation is able to benefit from native multicast according to the prior art. In addition, the act of using an overlay channel designation allows MediaBridge computers to regulate, and otherwise control, the transmission of packets associated with a specific stream to computers on the same local network as the MediaBridge computer. Another advantage is that, where additional destination computers such as 124 are "downstream" from transit domain 120 and also desire to receive on overlay channel "A," duplication of packets to the transit domain, and over links within the transit domain, is not necessary. Thus, the broadcast scales efficiently because only one copy of each packet needs to be sent to the transit domain from the content source via MediaBridge M6, and only one copy of each packet is transferred between MediaBridges within the transit domain.

Although the present example discusses a single MediaBridge computer associated with each local area network, other arrangements are possible. For example, a MediaBridge computer can be associated with more than one local area network where the networks are connected. Additionally, there may be more than one MediaBridge computer for a single local area network to provide fault tolerance and stability. The selection of the number of MediaBridge computers to use for a given number of networked computers, subnetworks, regions, domains, etc., is made based on the overall topology of the network area involved, traffic considerations, control requirements, etc. In general, there can be multiple transit domains interconnected in arbitrary ways by MediaBridges, or processors or processes performing one or more of the MediaBridge functions discussed herein.

As each MediaBridge computer receives information, or packets, designated for an overlay channel that the MediaBridge is participating in as a relay device, the MediaBridge computer checks an internally-stored table (i.e., the FIB) for the Internet protocol (IP) address of each peer machine that should receive the packet to ensure that the packet arrived from an acceptable peer. If so, the table indicates the IP addresses of additional peers to which the packet should be forwarded. It then transfers, or relays, copies of the packet to each of these machines. The preferred embodiment transfers the packets by using standard User Datagram Protocol (UDP). The efficiency of this distribution with respect to the present invention is largely determined by how a network administrator sets up the location of MediaBridges and the peer-to-peer tables in each MediaBridge computer. Naturally, one desirable scheme would minimize the amount of repetitious relays of the same packets to different MediaBridges by configuring the tables of peering relationships in a geographic, logical or network traffic sense, or in another arrangement designed to improve throughput, efficiency, control, monitoring or some other desirable goal. Efficiency of the overlay multicast system also depends on the extent to which native multicasting can be used to effect transfers.

Note that, that any point where a MediaBridge computer is in a store-andforward position with respect to the streaming content that the MediaBridge computer can make decisions as to whether, and where, to route the packets. In other words, every time a MediaBridge computer is used to relay a packet, there can be a control mechanism for restricting, managing or modifying the relayed information. Aspects of the present invention relating to management and control of the media stream are discussed in detail in the co-pending patent application(s) referenced at the beginning of this specification.

Assume that the video program is a television program with commercial slots. MediaBridge computer $M_2$ can be used to insert a locally customized commercial into an appropriate commercial slot. MediaBridge computer M1 can be used to restrict the video program entirely (e.g., a pay-per-view presentation) from some computers and allow it to others in LAN 126. Or, where MediaBridge computer 108 determines that the bandwidth requirements of streaming the complete video program are too high for LAN 126, MediaBridge computer 108 can restrict the bandwidth of the video program, e.g., by reducing the image size, resolution, frame rate, color depth, etc. Other benefits are possible. For example, any MediaBridge can store, or cache all, or a portion of, the video program information. Caching decisions can be controlled by administratively specified bandwidth policies and traffic classes as described in co-pending patent application(s) referenced at the beginning of this specification.

In the discussion above, FIGS. 4A-C have illustrated a unicast-initiated overlay routing scenario. Another type of scenario is initiated in a multicast manner and is referred to as multicast-initiated overlay routing.

Multicast-initiated overlay routing differs from unicast-initiated overlay routing only in the manner that the destination computer subscribes to the content stream. In contrast to the unicast-initiated approach, the multicast-initiated approach allows a destination computer, such as destination computer 102 in FIGS. 4A-C, to make a request via. a native multicast to join a particular native multicast group. For example, in the discussion above with respect to FIGS. 4A-C, destination computer 102 can make a multicast request to join native multicast group "a." MediaBridge computer 108 is programmed to detect such requests by monitoring IGMP traffic on the LAN, and processes the request by performing the steps described above to subscribe to native multicast group "a".

Table I, below, provides an overview summary with respect to data structures and how they are created and used in the examples discussed above in FIGS. 4A-C. Note that, although specific mechanisms, formats and uses are mentioned in relation to the data, that other possibilities are within the scope of the present invention. For example, tables can be constructed, modified, transferred and maintained (i.e., "processed") by manual means, or automatically by one or more processors or computers. The data and data structures can be processed by any prior art methods, systems and protocols or can be processed by specific new techniques as presented in this specification. The steps of Table I can be performed in a different order than the order shown in Table I. Also, all of the steps of Table I may not be necessary to practice the invention and additional steps can be included without exceeding the bounds of the invention.

1. A link registry is stored in, or made available to, R7. The link registry associates MediaBridge MI with computers on M1's LAN, including destination computer 102.

2. Mapping tables associating M2, M3, M4 and M5 via a native multicasting channel are determined for purposes of native multicasting information within transit domain 120.

3. A request is made by content source 100 to register with the overlay network. This is handled by using an external directory source. The association between the content source and the overlay channel group designation can be transferred among MediaBridges.

4. Destination computers, such as destination computer 102 make requests for content information. Examples of how this is done include (a) using a hyperlink to receive a URL from web server 104 that redirects destination computer to MediaBridge M1 according to the link registry at R7, where the redirection includes an identification of the content source such as by using the content source's overlay address, "A";

(b) destination computer 102 makes a unicast or multicast request of a MediaBridge, such as M1, for content by using the content source's native address, overlay address or other identification.

5. MediaBridge M1 sends a subscribe request for the content source information by using the overlay address "A" or other identification.

6. MediaBridge M2 receives the subscribe request and adds an association of overlay group address "A" with M1 so that packets from content source 100 received by M2 are sent to M1 and eventually to destination computer 102. Note that subscription can occur prior to, during, or even after content source 100 begins streaming data.

7. As M6 received packets from content source 100, M6 adds a header corresponding to. the overlay group address "A" to each packet. Each packet with header "A" received by any of the MediaBridges is sent along the associated paths to other MediaBridges. This means that MediaBridges within the transit domain receive "A" packets via native multicast over channel "a". To achieve native multicast, the overlay address is included in the overlay header and carried in the native multicast packet. MediaBridges can add back the overlay address in the header for subsequent delivery to other MediaBridges. For example, M2's transmission of "A" packets to M1 includes the overlay address in the header. This allows M1 to continue overlay routing within M1's LAN of multiple overlay channels.

8. At each receipt of packets within a MediaBridge, benefits of bandwidth management, control, monitoring and other features through additional processing are possible as discussed herein and in co-pending patent applications referenced above.

Table I

1. A link registry is stored in, or made available to, R7. The link registry associates MediaBridge M1 with computers on M1's LAN, including destination computer 102.

2. Mapping tables associating M2, M3, M4 and M5 via a native multicasting channel are determined for purposes of native multicasting information within transit domain 120.

3. A request is made by content source 100 to register with the overlay network. This is handled by using an external directory source. The association between the content source and the overlay channel group designation can be transferred among MediaBridges.

4. Destination computers, such as destination computer 102 make requests for content information. Examples of how this is done include (a) using a hyperlink to receive a URL from web server 104 that redirects destination computer to MediaBridge M1 according to the link registry at R7, where the redirection includes an identification of the content source such as by using the content source's overlay address, "A";

(b) destination computer 102 makes a unicast or multicast request of a MediaBridge, such as M1, for content by using the content source's native address, overlay address or other identification.

5. MediaBridge M1 sends a subscribe request for the content source information by using the overlay address "A" or other identification.

6. MediaBridge M2 receives the subscribe request and adds an association of overlay group address "A" with M1 so that packets from content source 100 received by M2 are sent to M1 and eventually to destination computer 102. Note that subscription can occur prior to, during, or even after content source 100 begins streaming data.

7. As M6 received packets from content source 100, M6 adds a header corresponding to. the overlay group address "A" to each packet. Each packet with header "A" received by any of the MediaBridges is sent along the associated paths to other MediaBridges. This means that MediaBridges within the transit domain receive "A" packets via native multicast over channel "a". To achieve native multicast, the overlay address is included in the overlay header and carried in the native multicast packet. MediaBridges can add back the overlay address in the header for subsequent delivery to other MediaBridges. For example, M2's transmission of "A" packets to M1 includes the overlay address in the header. This allows M1 to continue overlay routing within M1's LAN of multiple overlay channels.

8. At each receipt of packets within a MediaBridge, benefits of bandwidth management, control, monitoring and other features through additional processing are possible as discussed herein and in co-pending patent applications referenced above.

Figure 6:
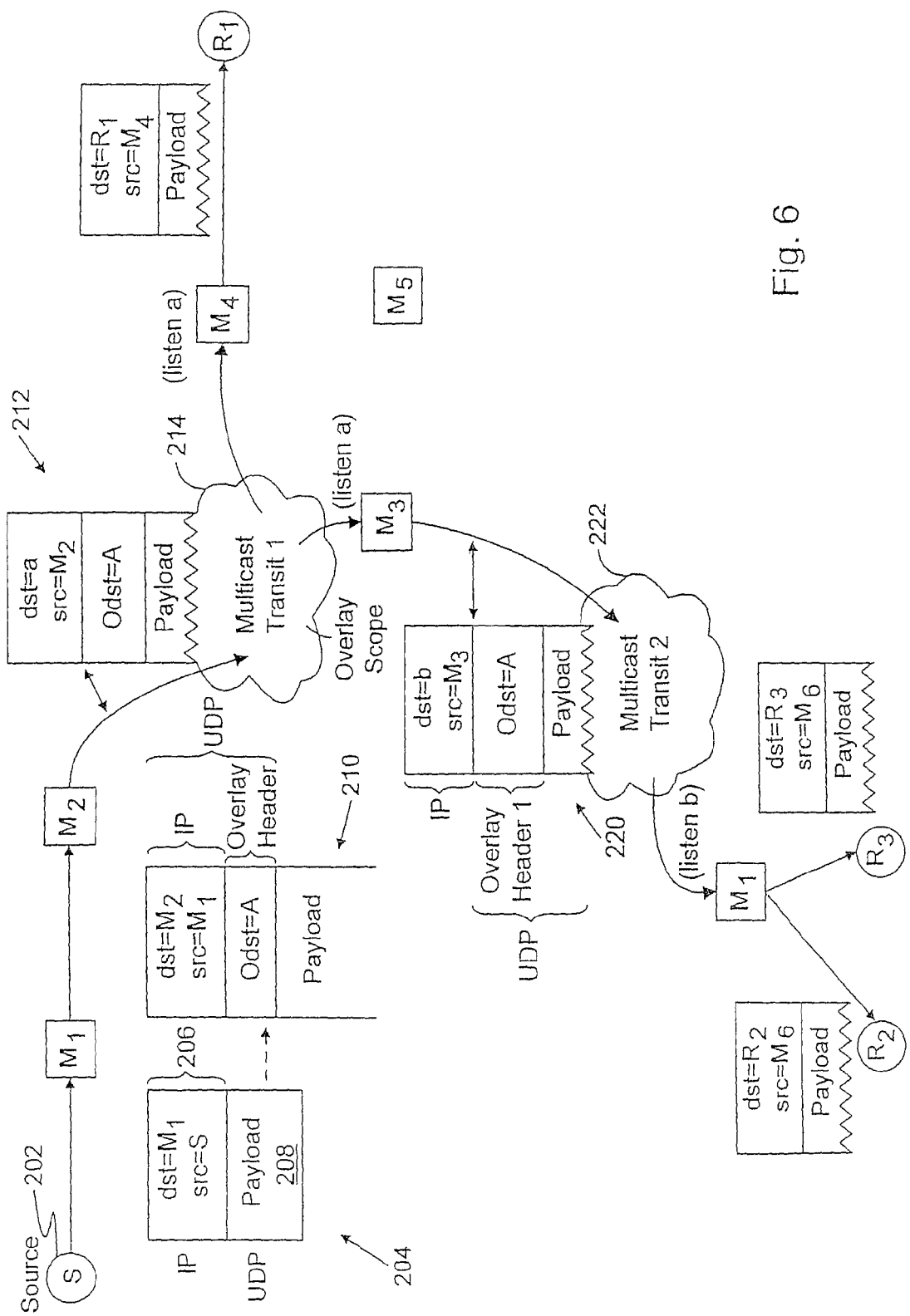
FIG. 6 illustrates details of header and address processing in the present invention.

FIG. 6 illustrates details of header and address processing in the present invention.

In FIG. 6, content source 202 sends information in the form of packets such as packet 204. Packet 204 includes an IP header 206 having a destination field and source field. The destination field indicates that the packet is destined for MediaBridge M1 and that the source for the packet is S. The packet data is contained in a UDP format "payload" 208. When MediaBridge computer M1 received the packet, it changes the destination and source indications to M2 and M1, respectively. Additionally, an overlay header is inserted between the IP header and the payload. This packet is shown at 210. The overlay channel indication is "A" in the overlay header, which is also in UDP format.

Packet 210 is received by MediaBridge computer M2. M2 is part of a native multicast group and so is able to distribute the packet via native multicast over the native multicast channel "a." Accordingly, M2 changes the destination and source indicators in the native header to "a" and M2, respectively. Packet 212 is then transmitted throughout multicast domain 214 where it is received by M3 and M4. MediaBridges such as M5 which haven't joined native multicast group "a" do not receive packet 212. MediaBridge M4 uses the overlay channel designation "A" to send the packet to client R1 after stripping off the overlay header "A" so that the packet appears to R1 as a standard packet. M3 and M4 both check the source address and overlay group of packet 212 to ensure that it came from an appropriate peer (in this case M2). If not, the packet would have been dropped.

Additional routing of the packet is performed by M3 by the use of a second native multicasting domain 222 using native multicast address "b." M3 uses native multicast group "b" by specifying the destination of packet 220 (having the same payload as packet 212) as "b."Thus, multiple different native multicast groups can be used to distribute the same overlay channel. Packet 220 is distributed through domain 222 via native multicast channel "b" to be received by M6 and other possible MediaBridges, routers, servers, computers, etc. (not shown) that are subscribed to native multicast channel "b." M6, similar to M4's operation, uses the overlay channel designation "A" to determine that the packet should be sent to R2 and R3. M6 first strips off the overlay channel information before sending the packet to R2 and R3.

Although the invention has been presented with respect to particular embodiments thereof, these embodiments merely illustrate possible embodiments of the invention, the scope of which is determined solely by the appended claims.

What is claimed is:

1. A computer-executed method comprising:
   a router device receiving data packets comprising a particular multicast data flow;
   receiving bandwidth information about bandwidth for a network link over which the particular multicast data flow is to be sent;
   based, at least in part, on one or more policies for the particular multicast data flow, transforming the particular multicast data flow to fit a bandwidth indicated in the bandwidth information to produce a transformed multicast data flow; and
   transmitting the transformed multicast data flow over the network link.

2. The computer-executed method of claim 1, further comprising:
   determining that the particular multicast data flow includes data for a particular application class;
   wherein the one or more policies are associated with the particular application class; and
   in response to determining that the particular multicast data flow includes data for the particular application class, selecting the one or more policies for the particular multicast data flow based, at least in part, on the particular application class of the particular multicast data flow.

3. The computer-executed method of claim 1, wherein:
   the one or more policies are application-level policies; and
   transforming the particular multicast data flow to fit the bandwidth comprises:
      identifying one or more cues in audio information in the particular multicast data flow, and
      in response to identifying the one or more cues in the audio information, dedicating a particular portion of the bandwidth to current speaker audio information of the audio information.

4. A computer-executed method comprising:
   a router device maintaining, for each application class of a plurality of application classes, a distinct set of one or more policies;
   the router device receiving data packets comprising a particular multicast data flow;
   determining that the particular multicast data flow includes data for a particular application class of the plurality of application classes;
   transforming the particular multicast data flow based, at least in part, on a set of one or more policies, maintained at the router device for the particular application class, to produce a transformed multicast data flow; and
   transmitting the transformed multicast data flow over a network link.

5. The computer-executed method of claim 4, wherein transforming the particular multicast data flow comprises reducing data from the particular multicast data flow based on bandwidth available at the network link.

6. The computer-executed method of claim 4, wherein transforming the particular multicast data flow comprises reducing data from the particular multicast data flow based on application level information for the particular multicast data flow.

7. The computer-executed method of claim 6, further comprising:
   receiving a message indicating application-level attributes for the particular multicast data flow;
   wherein the application-level information for the particular multicast data flow comprises the application-level attributes.

8. The computer-executed method of claim 4, further comprising:
   the router device maintaining a set of two or more traffic processing agents;
   wherein a particular traffic processing agent, of the set of two or more traffic processing agents, is configured to process data flows that include data for the particular application class;
   prior to transforming the particular multicast data flow and in response to determining that the particular multicast data flow includes data for the particular application class, selecting the particular traffic processing agent, of the set of two or more traffic processing agents, that is configured to process data flows that include data for the particular application class;
   wherein transforming the particular multicast data flow is performed by the particular traffic processing agent.

9. The computer-executed method of claim 8, further comprising, prior to selecting the particular traffic processing agent:
   the router device receiving information for the particular traffic processing agent;
   wherein prior to receiving information for the particular traffic processing agent, the particular traffic processing agent is not part of the set of two or more traffic processing agents maintained by the router device; and
   in response to receiving the information for the particular traffic processing agent, the router device adding the particular traffic processing agent to the set of two or more traffic processing agents.

10. The computer-executed method of claim 8, wherein the one or more policies, maintained for the particular application class, are maintained in connection with the particular traffic processing agent.

11. A non-transitory computer-readable media storing instructions which, when executed by one or more processors, cause performance of the steps of:
   a router device receiving data packets comprising a particular multicast data flow;
   receiving bandwidth information about bandwidth for a network link over which the particular multicast data flow is to be sent;
   based, at least in part, on one or more policies for the particular multicast data flow, transforming the particular multicast data flow to fit a bandwidth indicated in the bandwidth information to produce a transformed multicast data flow; and
   transmitting the transformed multicast data flow over the network link.

12. The one or more non-transitory computer-readable media of claim 11, further comprising instructions for:
   determining that the particular multicast data flow includes data for a particular application class;
   wherein the one or more policies are associated with the particular application class; and in response to determining that the particular multicast data flow includes data for the particular application class, selecting the one or more policies for the particular multicast data flow based, at least in part, on the particular application class of the particular multicast data flow.

13. The one or more non-transitory computer-readable media of claim 11, wherein:
the one or more policies are one or more application-level policies; and
transforming the particular multicast data flow to fit the bandwidth comprises:
identifying one or more cues in audio information in the particular multicast data flow, and
in response to identifying the one or more cues in the audio information, dedicating a particular portion of the bandwidth to current speaker audio information of the audio information.

14. A non-transitory computer-readable media storing instructions which, when executed by one or more processors, cause performance of the steps of:
a router device maintaining, for each application class of a plurality of application classes, a distinct set of one or more policies;
the router device receiving data packets comprising a particular multicast data flow;
determining that the particular multicast data flow includes data for a particular application class of the plurality of application classes;
transforming the particular multicast data flow based, at least in part, on a set of one or more policies, maintained at the router device for the particular application class, to produce a transformed multicast data flow; and
transmitting the transformed multicast data flow over a network link.

15. The one or more non-transitory computer-readable media of claim 14, wherein transforming the particular multicast data flow comprises reducing data from the particular multicast data flow based on bandwidth available at the network link.

16. The one or more non-transitory computer-readable media of claim 14, wherein transforming the particular multicast data flow comprises reducing data from the particular multicast data flow based on application-level information for the particular multicast data flow.

17. The one or more non-transitory computer-readable media of claim 16, further comprising instructions for:
receiving a message indicating one or more application-level attributes for the particular multicast data flow;
wherein the application-level information for the particular multicast data flow comprises the one or more application-level attributes.

18. The one or more non-transitory computer-readable media of claim 14, further comprising instructions for:
the router device maintaining a set of two or more traffic processing agents;
wherein a particular traffic processing agent, of the set of two or more traffic processing agents, is configured to process data flows that include data for the particular application class;
prior to transforming the particular multicast data flow and in response to determining that the particular multicast data flow includes data for the particular application class, selecting the particular traffic processing agent, of the set of two or more traffic processing agents, that is configured to process data flows that include data for the particular application class;
wherein transforming the particular multicast data flow is performed by the particular traffic processing agent.

19. The one or more non-transitory computer-readable media of claim 18, further comprising instructions for:
prior to selecting the particular traffic processing agent:
the router device receiving information for the particular traffic processing agent;
wherein prior to receiving information for the particular traffic processing agent, the particular traffic processing agent is not part of the set of two or more traffic processing agents maintained by the router device; and
in response to receiving the information for the particular traffic processing agent, the router device adding the particular traffic processing agent to the set of two or more traffic processing agents.

20. The one or more non-transitory computer-readable media of claim 18, wherein the one or more policies, maintained for the particular application class, are maintained in connection with the particular traffic processing agent.

* * * * *